(12) United States Patent
Shibata et al.

(10) Patent No.: US 10,335,727 B2
(45) Date of Patent: Jul. 2, 2019

(54) HONEYCOMB FILTER

(71) Applicant: IBIDEN CO., LTD., Ogaki-shi (JP)

(72) Inventors: Toshiaki Shibata, Ibi-gun (JP); Akihito Ogiso, Ibi-gun (JP); Hirokazu Suzuki, Ibi-gun (JP)

(73) Assignee: IBIDEN CO., LTD., Ogaki-shi (JP)

( * ) Notice: Subject to any disclaimer, the term of this patent is extended or adjusted under 35 U.S.C. 154(b) by 266 days.

(21) Appl. No.: 15/412,058

(22) Filed: Jan. 23, 2017

(65) Prior Publication Data

US 2017/0197168 A1    Jul. 13, 2017

Related U.S. Application Data

(63) Continuation of application No. PCT/JP2015/070545, filed on Jul. 17, 2015.

(30) Foreign Application Priority Data

Jul. 23, 2014  (JP) ................................ 2014-150047

(51) Int. Cl.
*B01D 46/24* (2006.01)
*B01D 39/20* (2006.01)
(Continued)

(52) U.S. Cl.
CPC .......... *B01D 46/247* (2013.01); *B01D 39/20* (2013.01); *B01D 39/2068* (2013.01);
(Continued)

(58) Field of Classification Search
None
See application file for complete search history.

(56) References Cited

U.S. PATENT DOCUMENTS 4,276,071 A * 6/1981 Outland ............... B01D 46/247
428/116
4,417,908 A * 11/1983 Pitcher, Jr. ......... B01D 46/0001
210/510.1
(Continued)

FOREIGN PATENT DOCUMENTS

DE   102008042372   4/2009
EP       2862611    4/2015
(Continued)

OTHER PUBLICATIONS

Office Action issued by the United States Patent and Trademark Office for the co-pending U.S. Appl. No. 15/412,057, dated Nov. 23, 2018.
(Continued)

*Primary Examiner* — Amber R Orlando
(74) *Attorney, Agent, or Firm* — Mori & Ward, LLP

(57) ABSTRACT

The present invention provides a honeycomb filter including a honeycomb fired body including porous cell partition walls, exhaust gas introduction cells each having an open end at an exhaust gas inlet side and a plugged end at an exhaust gas outlet side, exhaust gas emission cells each having an open end at the exhaust gas outlet side and a plugged end at the exhaust gas inlet side, and an outer wall on the periphery thereof. The cross-sectional shape of each exhaust gas introduction cell in a plane perpendicular to the longitudinal direction thereof is entirely uniform from the end at the exhaust gas inlet side to the end at the exhaust gas outlet side excluding the plugged portion. The cross-sectional shape of each exhaust gas emission cell in a plane perpendicular to the longitudinal direction thereof is entirely uniform from the end at the exhaust gas inlet side to the end at the exhaust gas outlet side excluding the plugged portion. The exhaust gas emission cells, except for the cells adjacent to the outer wall, are each adjacently surrounded fully by the (Continued)

exhaust gas introduction cells across the porous cell partition walls. The cells adjacent to the outer wall include the exhaust gas introduction cells and the exhaust gas emission cells. A substantial ratio of the number of the exhaust gas introduction cells to the number of the exhaust gas emission cells (exhaust gas introduction cells:exhaust gas emission cells) is 4:1. All the exhaust gas introduction cells, except for the cells adjacent to the outer wall, have the same cross-sectional area in a plane perpendicular to the longitudinal direction thereof, the cross-sectional area of each exhaust gas introduction cell being smaller than that of each exhaust gas emission cell in a plane perpendicular to the longitudinal direction thereof.

12 Claims, 11 Drawing Sheets

(51) Int. Cl.
B01D 46/00 (2006.01)
C04B 38/00 (2006.01)
F01N 3/022 (2006.01)

(52) U.S. Cl.
CPC ......... B01D 46/00 (2013.01); B01D 46/2474 (2013.01); C04B 38/00 (2013.01); C04B 38/0006 (2013.01); F01N 3/022 (2013.01); F01N 3/0222 (2013.01); B01D 2046/2433 (2013.01); B01D 2046/2481 (2013.01); B01D 2046/2485 (2013.01); B01D 2046/2492 (2013.01); B01D 2046/2496 (2013.01)

(56) References Cited

U.S. PATENT DOCUMENTS

| | | | | |
|---|---|---|---|---|
| 9,080,484 | B2* | 7/2015 | Miyairi | F01N 3/035 |
| 9,289,711 | B2* | 3/2016 | Hirakawa | B01D 46/2429 |
| 9,550,175 | B2* | 1/2017 | Shibata | B01D 46/247 |
| 9,919,255 | B2* | 3/2018 | Shibata | B01D 46/00 |
| 9,975,076 | B2* | 5/2018 | Shibata | F01N 3/0222 |
| 2005/0016141 | A1 | 1/2005 | Hong et al. | |
| 2005/0274097 | A1* | 12/2005 | Beall | B01D 46/247 55/523 |
| 2007/0212517 | A1* | 9/2007 | Ohno | B01D 46/2455 428/116 |
| 2009/0205301 | A1* | 8/2009 | Komori | F01N 3/0222 55/385.1 |
| 2010/0058725 | A1* | 3/2010 | Konomi | B01D 46/244 55/523 |
| 2010/0269697 | A1* | 10/2010 | Vincent | B01D 46/247 95/273 |
| 2011/0224069 | A1* | 9/2011 | Goto | B01D 46/2429 502/100 |
| 2012/0031062 | A1 | 2/2012 | Komori et al. | |
| 2013/0055694 | A1* | 3/2013 | Salmona | B01D 46/2429 55/523 |
| 2013/0239532 | A1* | 9/2013 | Sakashita | B01D 46/247 55/529 |
| 2015/0071829 | A1* | 3/2015 | Oya | C04B 35/6263 422/180 |
| 2015/0072104 | A1 | 3/2015 | Iwasaki et al. | |

FOREIGN PATENT DOCUMENTS

| | | | | |
|---|---|---|---|---|
| JP | 58-196820 | 11/1983 | | |
| JP | 2009-095827 | 5/2009 | | |
| JP | 2010-053697 | 3/2010 | | |
| JP | 2012-254441 | 12/2012 | | |
| JP | 2013-039514 | 2/2013 | | |
| JP | 2013-215645 | 10/2013 | | |
| JP | 2014-028327 | 2/2014 | | |
| JP | 2014-050793 | 3/2014 | | |
| JP | 2014200741 A | * | 10/2014 | F01N 3/035 |
| WO | WO 2004/024294 | 3/2004 | | |
| WO | WO 2007/134897 | 11/2007 | | |
| WO | WO 2013/150970 | 10/2013 | | |
| WO | WO 2013/187444 | 12/2013 | | |

OTHER PUBLICATIONS

Office Action issued by the United States Patent and Trademark Office for the co-pending U.S. Appl. No. 15/412,059, dated Oct. 5, 2018.

* cited by examiner

CROSS-SECTIONAL VIEW TAKEN ALONG LINE A-A

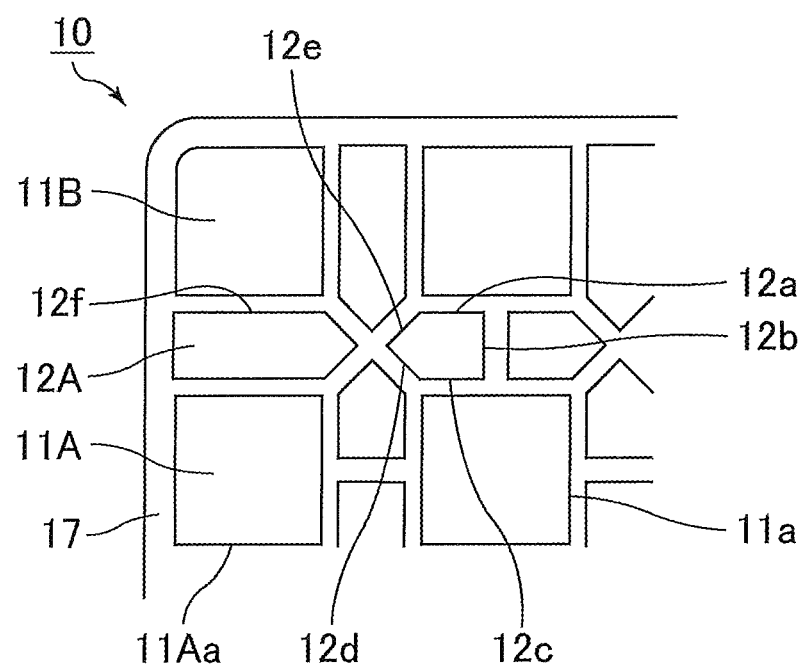

CROSS-SECTIONAL VIEW TAKEN ALONG LINE B-B

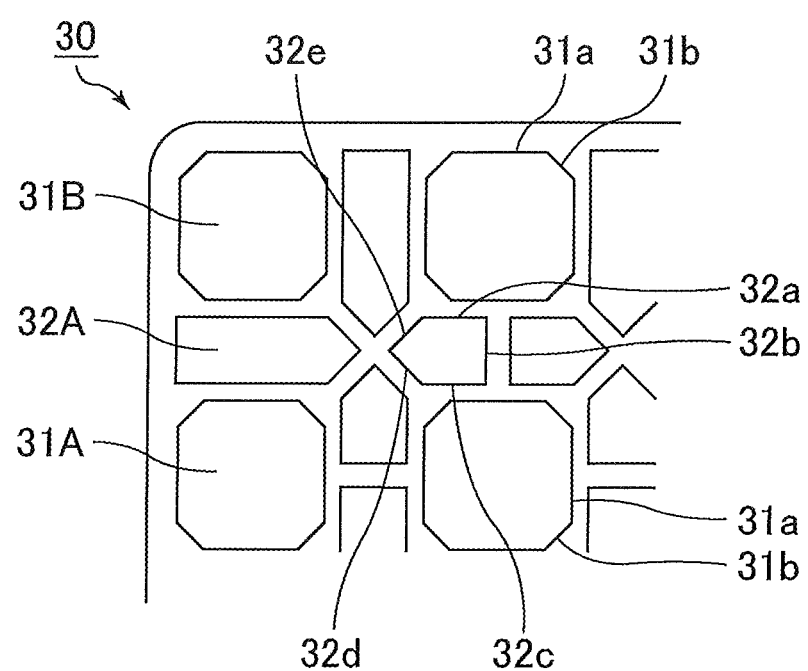

HONEYCOMB FILTER

TECHNICAL FIELD

The present invention relates to a honeycomb filter.

BACKGROUND ART

Particulates (hereinafter also referred to as PM) such as soot in exhaust gas discharged from internal combustion engines including diesel engines and gasoline engines cause damage to environment and human bodies, which has been a problem these days. Since exhaust gas contains toxic gas components such as CO, HC, and NOx, there has also been a concern for adverse effects of the toxic gas components on the environment and human bodies.

In response, various filters having honeycomb structures (honeycomb filters) formed of porous ceramics such as cordierite and silicon carbide have been proposed as exhaust gas purifying apparatus. Such honeycomb filters are connected to internal combustion engines to capture PM in exhaust gas, or to convert the toxic gas components such as CO, HC, and NOx in the exhaust gas into nontoxic gas.

Recent exhaust gas regulations are increasingly strict for both diesel engines and gasoline engines, and there is a demand to provide an exhaust gas purification device that complies with such strict exhaust gas regulations. For example, exhaust gas purification devices including only a catalyst carrier carrying oxidation catalyst and a honeycomb filter that captures PM were sufficient enough to perform after-treatment of exhaust gas to a level that satisfies the exhaust gas regulations. However, due to an increased demand for NOx purification, exhaust gas purification devices are now required to include another catalyst carrier carrying SCR catalyst or a device such as an ammonia spraying mechanism to activate the SCR catalyst.

Based on such background, smaller catalyst carriers and smaller honeycomb filters are required on the premise that the above-described mechanism to activate catalyst is incorporated into exhaust gas purification devices. In particular, a honeycomb filter having a structure that can further suppress pressure loss is required.

Conventional honeycomb filters capable of reducing the pressure loss are disclosed in the following Patent Literature 1 to Patent Literature 4.

FIG. 8(a) is a perspective view schematically showing a honeycomb filter disclosed in Patent Literature 1. FIG. 8(b) is a perspective view schematically showing a honeycomb fired body constituting the honeycomb filter.

As shown in FIG. 8(a) and FIG. 8(b), Patent Literature 1 discloses a honeycomb filter 90 formed by combining a plurality of honeycomb fired bodies 100 with one another with adhesive layers 105 therebetween and forming a peripheral coat layer 106 on the periphery of the aggregate of the combined honeycomb fired bodies, wherein the honeycomb fired bodies 100 each include exhaust gas introduction cells 102 each having an open end at the exhaust gas inlet side and a plugged end at the exhaust gas outlet side, and exhaust gas emission cells 101 each having an open end at the exhaust gas outlet side and a plugged end at the exhaust gas inlet side; the exhaust gas emission cells 101 each have a square cross section perpendicular to the longitudinal direction thereof; the exhaust gas introduction cells 102 each have an octagonal cross section perpendicular to the longitudinal direction thereof; and the exhaust gas emission cells 101 and the exhaust gas introduction cells 102 are alternately arranged with each other (a grid-like pattern).

Hereinafter, in the description of the present invention and the background art, a cell having an open end at the exhaust gas outlet side and a plugged end at the exhaust gas inlet side is simply described as an exhaust gas emission cell. A cell having an open end at the exhaust gas inlet side and a plugged end at the exhaust gas outlet side is simply described as an exhaust gas introduction cell.

The simple term "cell" means both the exhaust gas emission cell and the exhaust gas introduction cell.

Further, a cross section of the exhaust gas introduction cells and the exhaust gas emission cells in a plane perpendicular to the longitudinal direction thereof is simply described as a cross section of the exhaust gas introduction cells and the exhaust gas emission cells.

FIG. 9(a) is a perspective view schematically showing a honeycomb filter disclosed in Patent Literature 2. FIG. 9(b) is a view schematically showing an end face of the honeycomb filter.

Patent Literature 2 discloses a honeycomb filter 110 in which all the cells have the same square cross-sectional shape as shown in FIG. 9(a) and FIG. 9(b). In the honeycomb filter 110, exhaust gas emission cells 111 each having an open end at the exhaust gas outlet side and a plugged end at the exhaust gas inlet side are adjacently surrounded fully by exhaust gas introduction cells 112 and 114 across cell partition walls 113. The exhaust gas introduction cells 112 and 114 each have an open end at the exhaust gas inlet side and a plugged end at the exhaust gas outlet side. A substantial ratio of the number of the exhaust gas introduction cells to the number of the exhaust gas emission cells (exhaust gas introduction cells:exhaust gas emission cells) is 3:1.

FIG. 10 is a cross-sectional view schematically showing a cross section of a honeycomb filter according to Patent Literature 3.

As shown in FIG. 10, Patent Literature 3 discloses a honeycomb filter 120 including exhaust gas emission cells 121 having a hexagonal cross-sectional shape and exhaust gas introduction cells 122 having hexagonal cross-sectional shape. Each exhaust gas emission cell 121 has an open end at the exhaust gas outlet side and a plugged end at the exhaust gas inlet side. Each exhaust gas introduction cell 122 has an open end at the exhaust gas inlet side and a plugged end at the exhaust gas outlet side. Each exhaust gas emission cell 121 is adjacently surrounded fully by the exhaust gas introduction cells 122 across cell partition walls 123. It should be noted that the cross-sectional shape of each exhaust gas emission cell 121 is a regular hexagon, but the cross-sectional shape of each exhaust gas introduction cell 122 is a hexagon in which sides a and b with different lengths are alternately arranged with each other. In addition, a substantial ratio of the number of the exhaust gas introduction cells to the number of the exhaust gas emission cells (exhaust gas introduction cells:exhaust gas emission cells) is 2:1.

FIG. 11 is a cross-sectional view schematically showing a cross section of a honeycomb fired body constituting a honeycomb filter according to Patent Literature 4.

As shown in FIG. 11, Patent Literature 4 discloses a honeycomb filter 130 including exhaust gas emission cells 131 having an octagonal cross-sectional shape and two types of exhaust gas introduction cells with different cross-sectional shapes, i.e., first exhaust gas introduction cells 132 and second exhaust gas introduction cells 134. Each exhaust gas emission cell 131 has an open end at the exhaust gas outlet side and a plugged end at the exhaust gas inlet side, and the first exhaust gas introduction cells 132 and the second exhaust gas introduction cells 134 each have an open end at the exhaust gas inlet side and a plugged end at the exhaust gas outlet side. Each exhaust gas emission cell 131 is adjacently surrounded fully by the first exhaust gas introduction cells 132 and the second exhaust gas introduction cells 134 across cell partition walls 133. Specifically, these exhaust gas introduction cells include two types of cells: the first exhaust gas introduction cells 132 each having a square cross-sectional shape and the second exhaust gas introduction cells 134 each having an octagonal cross-sectional shape whose area is larger than that of the first exhaust gas introduction cell 132; and the cross-sectional area of each exhaust gas emission cell 131 is equal to or larger than the cross-sectional area of each second exhaust gas introduction cell 134. In addition, a substantial ratio of the number of the exhaust gas introduction cells to the number of the exhaust gas emission cells (exhaust gas introduction cells:exhaust gas emission cells) is 3:1.

CITATION LIST

Patent Literature

Patent Literature 1: WO 2004/024294
Patent Literature 2: U.S. Pat. No. 4,417,908
Patent Literature 3: WO 2007/134897
Patent Literature 4: WO 2013/187444

SUMMARY OF INVENTION

Technical Problem

In the case of the honeycomb filter 90 disclosed in Patent Literature 1, which is shown in FIG. 8, the cross-sectional area of each exhaust gas introduction cell 102 is larger than the cross-sectional area of each exhaust gas emission cell 101, so that the flow-through resistance upon flowing of exhaust gas through the exhaust gas emission cell 101 and the outflow resistance upon flowing of exhaust gas out of the exhaust gas emission cell 101 are high, resulting in a high pressure loss.

In the case of a honeycomb filter 110 disclosed in Patent Literature 2, which is shown in FIG. 9, the cross-sectional area of each exhaust gas emission cell 111 is small. Thus, as in the honeycomb filter 90 shown in FIG. 8, the flow-through resistance upon flowing of exhaust gas through the exhaust gas emission cell 111 and the outflow resistance upon flowing of exhaust gas out of the exhaust gas emission cell 111 are high, resulting in a high pressure loss.

In the case of the honeycomb filter 120 disclosed in Patent Literature 3, which is shown in FIG. 10, each exhaust gas emission cell 121 having a hexagonal cross-sectional shape is surrounded fully by six exhaust gas introduction cells 122 each also having a hexagonal cross-sectional shape. The volume of each exhaust gas introduction cell 122 is smaller than the volume of each exhaust gas emission cell 121, so that the resistance upon flowing of exhaust gas through the exhaust gas emission cell 121 and the resistance upon flowing of exhaust gas out of the filter can be suppressed. Yet, the cross-sectional shape of the cells adjacent to the outer wall is easily distorted because the cells have a hexagonal cross-sectional shape, and a further reduction in the pressure loss is desired. Thus, there was a room for improvement in the shapes of the exhaust gas emission cells and the exhaust gas introduction cells.

The honeycomb filter 130 disclosed in Patent Literature 4, which is shown in FIG. 11, is a honeycomb filter previously proposed by the present inventors. Each exhaust gas emission cell 131 having an octagonal cross-sectional shape is surrounded fully by two types of exhaust gas introduction cells with different cross-sectional shapes, i.e., the first exhaust gas introduction cells 132 and the second exhaust gas introduction cells 134. The cross-sectional area of each exhaust gas emission cell 131 is larger than the cross-sectional area of each first exhaust gas introduction cell 132. Thus, the resistance upon flowing of exhaust gas through the exhaust gas emission cell 131 and the resistance upon flowing of exhaust gas out of the filter can be suppressed. In addition, accumulation of a certain amount of PM causes switching of the main flow channel, and PM starts to accumulate also on the inner wall surface of the second exhaust gas introduction cell 134 whose cross-sectional area is larger than that of the first exhaust gas introduction cell 132. The total volume of the first exhaust gas introduction cells 132 and the second exhaust gas introduction cells 134 is larger the total volume of the exhaust gas emission cells 131. Thus, a layer of PM accumulated on the exhaust gas introduction cells does not become much thick, and a low pressure loss can be maintained.

Further, in regard to the cells adjacent to the outer wall, the total volume of exhaust gas emission cells 131A and 131B is larger than the total volume of exhaust gas introduction cells 132A, so that exhaust gas flows easily from the exhaust gas introduction cells 132A adjacent to the outer wall to the exhaust gas emission cells 131A and 131B having a large volume, and exhaust gas can flow not only through partition walls 133a that define the exhaust gas introduction cells 132A adjacent to the outer wall but also an outer wall 137 that defines the exhaust gas introduction cells 132A. Thus, a substantial filtration area can be made sufficiently large. This makes it possible to provide a honeycomb filter in which the pressure loss at an early stage is low and the pressure loss is less likely to increase even after accumulation of PM.

However, since the honeycomb filter 130 disclosed in Patent Literature 4 includes two types of exhaust gas introduction cells with different cross-sectional shapes (i.e., the first exhaust gas introduction cell 132 and the second exhaust gas introduction cell 134), it is particularly difficult to reduce the resistance upon flowing of exhaust gas through the first exhaust gas introduction cell 132 having a small cross-sectional area. This causes an increase in the pressure loss at an early stage (before accumulation of PM). In particular, in the case where the temperature of exhaust gas from the engine is high and PM is continuously burned before a large amount of PM accumulate in the honeycomb filter 130, a further reduction in the initial pressure loss has been desired.

The present invention is made in view of the above problem, and aims to provide a honeycomb filter in which the pressure loss before accumulation of PM (initial pressure loss) and the pressure loss after accumulation of PM are kept low.

Solution to Problem

Specifically, the present invention provides a honeycomb filter including a honeycomb fired body including porous cell partition walls defining a plurality of cells that serve as channels of exhaust gas, exhaust gas introduction cells each having an open end at an exhaust gas inlet side and a plugged end at an exhaust gas outlet side, exhaust gas emission cells each having an open end at the exhaust gas outlet side and a plugged end at the exhaust gas inlet side, and an outer wall on the periphery thereof, wherein the cross-sectional shape of each exhaust gas introduction cell in a plane perpendicular to the longitudinal direction thereof is entirely uniform from the end at the exhaust gas inlet side to the end at the exhaust gas outlet side excluding the plugged portion; the cross-sectional shape of each exhaust gas emission cell in a plane perpendicular to the longitudinal direction thereof is entirely uniform from the end at the exhaust gas inlet side to the end at the exhaust gas outlet side excluding the plugged portion; the exhaust gas emission cells, except for the cells adjacent to the outer wall, are each adjacently surrounded fully by the exhaust gas introduction cells across the porous cell partition walls; the cells adjacent to the outer wall include the exhaust gas introduction cells and the exhaust gas emission cells; a substantial ratio of the number of the exhaust gas introduction cells to the number of the exhaust gas emission cells (exhaust gas introduction cells:exhaust gas emission cells) is 4:1; and all the exhaust gas introduction cells, except for the cells adjacent to the outer wall, have the same cross-sectional area in a plane perpendicular to the longitudinal direction thereof, the cross-sectional area of each exhaust gas introduction cell being smaller than that of each exhaust gas emission cell in a plane perpendicular to the longitudinal direction thereof.

In the honeycomb filter of the present invention, except for some exceptions, each exhaust gas emission cell shares the exhaust gas introduction cells with other exhaust gas emission cells in a pattern in which each exhaust gas emission cell is adjacently surrounded fully by the exhaust gas introduction cells. This pattern is two-dimensionally repeated in four directions (left, right, up, down). In the honeycomb filter of the present invention, the phrase "a substantial ratio of the number of the exhaust gas introduction cells to the number of the exhaust gas emission cells (exhaust gas introduction cells:exhaust gas emission cells) is 4:1" means that the ratio of the number of the exhaust gas introduction cells to the number of the exhaust gas emission cells (exhaust gas introduction cells:exhaust gas emission cells) is 4:1 when the above-described repeating pattern of the exhaust gas emission cells and the exhaust gas introduction cells, except for the exceptional cells adjacent to the outer wall, is observed. Specifically, in the cross section of the honeycomb filter in a plane perpendicular to the longitudinal direction of the cells, exhaust gas introduction cells which correspond to four exhaust gas introduction cells and parts of exhaust gas emission cells which correspond to one exhaust gas emission cell are present in a square formed by connecting the geometric centroid of each of four adjacent exhaust gas emission cells. Since the square includes parts of partitioned cells, the number represents the number of cells to which the total area of these parts corresponds.

According to the present inventors, the pressure loss occurs due to (a) inflow resistance upon flowing of exhaust gas into the honeycomb filter, (b) flow-through resistance of the exhaust gas introduction cells, (c) passage resistance of the cell partition walls, (d) passage resistance upon passage of exhaust gas through a layer of accumulated PM, (e) flow-through resistance of the exhaust gas emission cells, and (f) outflow resistance upon flowing of exhaust gas out of the honeycomb filter.

In the honeycomb filter of the present invention, each exhaust gas emission cell is surrounded fully by the exhaust gas introduction cell across the porous cell partition walls, so that the cell partition walls surrounding each exhaust gas emission cell can be fully utilized.

In the honeycomb filter of the present invention, the flow-through resistance (b) of the exhaust gas introduction cells is slightly high due to the fact that the number of the exhaust gas introduction cells is four times that of the exhaust gas emission cells and the cross-sectional area of each exhaust gas introduction cell is relatively small. However, because of the flow-through resistance, the flow rate of exhaust gas flowing into the exhaust gas introduction cells is reduced and becomes uniform, and exhaust gas passes through a wide range of cell partitions walls in the longitudinal direction of the cells of the honeycomb filter and flows into the exhaust gas emission cells. Consequently, the passage resistance (c) of the cell partition walls is reduced and the thickness of a layer of accumulated PM on the cell partition wall becomes uniform and thin. Thus, the passage resistance (d) upon passage of exhaust gas through the layer of accumulated PM can be reduced.

In addition, since all the exhaust gas introduction cells have the same cross-sectional area, PM accumulates more uniformly on each exhaust gas introduction cell, and ash remaining in the honeycomb filter after burning and removal of PM accumulated on the honeycomb filter also accumulates more uniformly. Further, the number of the exhaust gas introduction cells is four times that of the exhaust gas emission cells, so that the volume of the exhaust gas introduction cells on which ash accumulates is also large, providing a sufficiently large filtration area even after accumulation of ash.

In the honeycomb filter of the present invention, the cells adjacent to the outer wall preferably include the exhaust gas introduction cells and the exhaust gas emission cells which are alternately arranged with each other.

In the honeycomb filter having the above structure, the cells adjacent to the outer wall include the exhaust gas introduction cells and the exhaust gas emission cells which are alternately arranged with each other. The cross-sectional area of each exhaust gas emission cell in a plane perpendicular to the longitudinal direction thereof is larger than the cross-sectional area of each exhaust gas introduction cell in a plane perpendicular to the longitudinal direction thereof, so that exhaust gas flows easily from the exhaust gas introduction cells adjacent to the outer wall to the exhaust gas emission cells each having a large cross-sectional area, and exhaust gas can flow not only through partition walls that define the exhaust gas introduction cells adjacent to the outer wall but also the outer wall that defines the exhaust gas introduction cells. Thus, a substantial filtration area can be maximized. This makes it possible to provide a honeycomb filter in which the initial pressure loss is lower and the pressure loss is further less likely to increase even after accumulation of PM.

In the honeycomb filter of the present invention, in a cross section perpendicular to the longitudinal direction of the cells, preferably, all the exhaust gas introduction cells are pentagonal, and the exhaust gas emission cells are square or octagonal.

When the cross-sectional shape of the exhaust gas emission cells is square or octagonal, and the cross-sectional shape of the exhaust gas introduction cells surrounding each exhaust gas emission cell is pentagonal, it is possible to easily design the cross-sectional shape of the honeycomb fired body constituting the honeycomb filter and to form exhaust gas introduction cells each having a wider filtration area. Thus, a honeycomb filter in which the pressure loss is lower can be provided.

In the honeycomb filter of the present invention, in a cross section perpendicular to the longitudinal direction of the cells, preferably, the exhaust gas introduction cells are pentagonal with three 90° internal angles and two non-adjacent 135° internal angles, the exhaust gas emission cells are square, and each exhaust gas emission cell is surrounded by eight exhaust gas introduction cells.

In the honeycomb filter configured as described above, the cross-sectional shape of the honeycomb fired body can be easily designed, the pressure loss of the honeycomb filter can be further reduced, and the strength of the structure can be increased.

In the honeycomb filter of the present invention, preferably, the thickness of the cell partition walls separating the cells of the honeycomb filter from each other is entirely uniform.

In the case where the thickness of the cell partition walls separating the cells from each other is entirely uniform, it allows exhaust gas to easily more uniformly pass through the cell partition walls, resulting in uniform accumulation of PM. Thus, the pressure loss can be reduced.

In the honeycomb filter of the present invention, in a cross section perpendicular to the longitudinal direction of the cells, preferably, a vertex of each cell is linearly chamfered or rounded, and a chamfer or rounding ratio R of the cell, which is expressed by the following equation (1), is 50 to 100%:

$$\text{Chamfer or rounding ratio } R(\%)=((\beta/\alpha)\times 100 \qquad (1),$$

where $\alpha$ represents the length of one side of a cell in a cross section perpendicular to the longitudinal direction thereof, and $\beta$ represents the length of a linearly chamfered or rounded portion of one side of the cell in a cross section perpendicular to the longitudinal direction thereof.

In the honeycomb filter having the above structure, the cells have a cross-sectional shape that is closer to a circle, so that the flow-through resistances (b) and (e) of the cells can be further reduced, thus providing a honeycomb filter in which the initial pressure loss is lower. In regard to the expression "a vertex of each cell is linearly chamfered or rounded" mentioned above, the "cell" in the expression refers to both the exhaust gas emission cell and the exhaust gas introduction cell.

In the honeycomb filter of the present invention, preferably, the outer wall has corners, and the exhaust gas introduction cells and the exhaust gas emission cells adjacent to the outer wall each have a side in contact with the outer wall in a cross section perpendicular to the longitudinal direction of the cells, the side being straight and parallel to a side defining an outer periphery of the outer wall, so that the thickness of the outer wall excluding the corners is uniform.

The outer wall increases the strength of the honeycomb fired body, further reduces local variations in the volume ratio between the exhaust gas emission cells and the exhaust gas introduction cells in the honeycomb fired body, and thus allows exhaust gas to flow more uniformly. As a result, the pressure loss can be reduced.

The honeycomb filter of the present invention is preferably formed by combining a plurality of honeycomb fired bodies with one another with an adhesive layer therebetween, and the number of the exhaust gas introduction cells is 3.2 to 4.0 times that of the exhaust gas emission cells.

When a plurality of honeycomb fired bodies are combined with one another with an adhesive layer therebetween, the adhesive layer acts as a buffer layer during regeneration or the like, preventing the honeycomb filter from being destroyed by thermal stress. The adhesive layer can also increase the mechanical strength. In addition, when the cells adjacent to the outer wall of the honeycomb fired body are taken into consideration, the number of the exhaust gas introduction cells is 3.2 to 4.0 times that of the exhaust gas emission cells.

In the honeycomb filter of the present invention, the thickness of the cell partition walls is preferably 0.075 mm to 0.310 mm.

The cell partition walls being made as thin as 0.075 mm to 0.310 mm can reduce the passage resistance upon passage of exhaust gas through the cell partition walls, and the pressure loss can be further reduced.

In the honeycomb filter of the present invention, the porosity of the cell partition walls is preferably 40 to 65%.

The cell partition walls having a porosity of 40 to 65% can successfully capture PM in exhaust gas, and the pressure loss due to the passage resistance of the cell partition walls can be kept low. This makes it possible to provide a honeycomb filter in which the initial pressure loss is low and the pressure loss is less likely to increase even after accumulation of PM.

In the honeycomb filter of the present invention, the honeycomb fired body is preferably formed of silicon carbide or silicon-containing silicon carbide.

The silicon carbide and the silicon-containing silicon carbide are materials having excellent heat resistance. As a result, the honeycomb filter of the present invention has excellent heat resistance.

In the honeycomb filter of the present invention, preferably, a peripheral coat layer is formed on the periphery of the honeycomb filter.

The peripheral coat layer serves to mechanically protect the cells inside. As a result, the honeycomb filter of the present invention has excellent mechanical characteristics such as compression strength.

The "cross-sectional shape of the cell" herein is the shape formed by inner walls of each exhaust gas emission cell or each exhaust gas introduction cell, in a cross section perpendicular to the longitudinal direction of the cells.

The "cross-sectional area" herein is the area of a cross-sectional shape formed by inner walls of each exhaust gas emission cell or each exhaust gas introduction cell, in across section perpendicular to the longitudinal direction of the cells. The "inner walls of each cell" are inner surfaces of a cell, among the surfaces of the cell partition walls defining the cell.

Further, the "side" herein is a segment between vertices of a polygon in the case where the cross-sectional shape formed by inner walls of each exhaust gas emission cell or each exhaust gas introduction cell is a polygon, in a cross section perpendicular to the longitudinal direction of the cells.

In addition, the "length of a side" is the length of the segment. In the case where a vertex is rounded in a curve, the length of a side is the length of a straight portion excluding the curved portion.

In the case where the vertex is rounded in a curve, the cell partition walls separating the cells from each other are thick at the curved portions, and thus the passage resistance is high at the rounded portions. Exhaust gas preferentially flows into straight portions, and thus the length of the straight portions needs to be adjusted. For this reason, it is reasonable to exclude the curved portions from consideration.

As for the length of a straight portion of the side excluding the curved portions, when each straight portion of a polygon is hypothetically extended and intersections of these hypothetical straight lines are regarded as hypothetical vertices, the length of the straight portion is preferably 80% or more of the length of a hypothetical side formed by connecting these hypothetical vertices. In the case of a cell having a polygonal cross-sectional shape, a reduction in the pressure loss, which is the effect of the present invention, can be achieved by adjusting the length of the sides, as long as the length of each side is 80% or more of the length of the hypothetical side.

In the honeycomb filter of the present invention, the thickness of the cell partition walls separating two cells from each other is defined as follows.

Specifically, the thickness of the cell partition wall separating two cells from each other is determined as follows: a perpendicular line is outwardly drawn from the midpoint of each side of the exhaust gas introduction cell until the perpendicular line intersects a cell. The distance from the midpoint to the first cell intersected by the perpendicular line is the thickness of the cell partition wall. In the case of a shape with rounded corners as described above, it is reasonable to exclude the curved portions from consideration.

In the present invention, electron microscope photographs are used to measure the length of the sides and the thickness of the cell partition walls, and to identify the cross-sectional shapes of the cells. The electron microscope photographs are taken with an electron microscope (FE-SEM: High resolution field emission scanning electron microscope S-4800, produced by Hitachi High-Technologies Corporation).

The electron microscope photographs need to be taken at a magnification which allows identification of the cross-sectional shape of the cells and measurement of the length of the sides, the thicknesses of the cell partition walls, and the cross-sectional area of the cells, without being disturbed by irregularities of particles or pores on the surface (inner wall) of the cell partition walls defining the cells. The electron microscope photographs are most suitably taken with an electron microscope at a magnification of 30X.

Specifically, the length of each side of the cell is measured using the scale of the electron microscope photograph, based on the above definitions of the length of the cells and the thickness of the cell partition walls. Then, the cross-sectional area is arithmetically determined based on the values such as the length of the cells. If it is complicated to arithmetically calculate the cross-sectional area, the cross-sectional area is measured as follows: a square piece (a square with a side having a scale length) corresponding to a unit area based on the scale of the electron microscope photograph and the cut-out piece is weighed. Separately, a cross section of a cell is cut out along the cross-sectional shape of the cell (in the case of a polygonal cell with a vertex rounded in a curve, the cell is cut out along the curved portions) and the cut-out piece is weighed. The cross-sectional area of the cell can be calculated from the weight ratio.

In addition, in the present invention, the measurement of the length of the cells, the thicknesses of the cell partition walls, and the cross-sectional area can be converted from the above-described manual measurement into electronic measurement by scanning the electron microscope photograph as image data or using the image data directly retrieved from the electron microscope and entering the scale of the photograph. The manual measurement method and the electronic measurement method are both based on the scale of the electron microscope image, and are based on the same principle. Thus, needless to say, there are no discrepancies in measurement results between these methods.

The electronic measurement can be performed using measurement software such as image analysis and grain size distribution measurement software (Mac-View (Version 3.5), produced by Mountech Co. Ltd.). With this software, a scanned electron microscope photograph or image data directly retrieved from the electron microscope is used to enter the scale of the photograph, and the range is specified along inner walls of a cell. Thereby, the cross-sectional area can be measured. The distance between any two points in the image can also be measured based on the scale of the electron microscope photograph.

To take a photograph of the cross section of a cell with the electron microscope, a filter is cut in a plane perpendicular to the longitudinal direction of the cells to prepare a 1 cm×1 cm×1 cm sample including the cut face; the sample is ultrasonically cleaned or coated with resin; and an electron microscope photograph of the sample is taken. The resin coating does not affect the measurement of the length of the sides of the cells and the thicknesses of the cell partition walls.

In the present invention, in a cross section of the cells forming the honeycomb filter in a plane perpendicular to the longitudinal direction of the cells, the cross-sectional shape formed by the inner walls of the exhaust gas introduction cell and the cross-sectional shape form by the inner walls of the exhaust gas emission cell are each entirely uniform from the exhaust gas inlet end to the exhaust gas outlet end of each cell excluding the plugged portion. Specifically, in the case of the exhaust gas introduction cell, in a cross-sectional view perpendicular to the longitudinal direction thereof, the cross-sectional shape formed by the inner walls thereof is the same shape at any point in the cross section from the exhaust gas inlet end to the exhaust gas outlet end excluding the plugged portion. The same shape means a congruent shape, and excludes similar shapes. Specifically, a similar shape is regarded as a different shape. The same explanation shall apply not only to the exhaust gas introduction cell but also to the exhaust gas emission cell. The plugged portions are excluded because the cross-sectional shape formed by the inner surfaces of the cell partition walls does not physically exist at the plugged portions due to the presence of the plugs.

The effects of the present invention are described in detail below, taking an embodiment of the honeycomb filter of the present invention as an example.

FIG. 1(a) and FIG. 1(b) are each an enlarged end face view in which a portion of an end face of the honeycomb filter according to one embodiment of the present invention is enlarged.

As shown in FIG. 1(a), in this honeycomb filter 20, an exhaust gas emission cell 11 having an open end at the exhaust gas outlet side and a plugged end at the exhaust gas inlet side is adjacently surrounded fully by exhaust gas introduction cells 12 each having an open end at the exhaust gas inlet side and a plugged end at the exhaust gas outlet side, across porous cell partition walls 13.

The cross-sectional shape of each exhaust gas emission cell 11 is a square in a plane perpendicular to the longitudinal direction thereof. In contrast, all the exhaust gas introduction cells 12 are pentagonal and have the same shape, but these are not equilateral pentagons. These pentagons each have three 90° internal angles and two non-adjacent 135° internal angles. As shown in FIG. 1(a), when the pentagon is divided by a dotted line 12X, it shows that the pentagon is formed from a combination of a rectangle and a right-angled isosceles triangle. Further, rectangular portions of two exhaust gas introduction cells 12 are adjacent to one of sides 11a of the cross section of the exhaust gas emission cell 11, and a right-angled isosceles triangle is attached to the outer side of each rectangle. This pattern is repeated along the four sides 11a forming the exhaust gas emission cell 11. When the focus is placed on the exhaust gas emission cell 11, one exhaust gas emission cell 11 is surrounded by eight exhaust gas introduction cells 12. This pattern is repeated in four directions (left, right, up, down).

In the general view, the rectangular-shaped exhaust gas emission cells 11 are aligned in four directions (left, right, up, down) with certain intervals between the cells. The exhaust gas introduction cells 12 are arranged in the empty space. Rectangular portions forming the exhaust gas introduction cells 12 are located between two exhaust gas emission cells 11. At the center surrounded by four exhaust gas emission cells 11, the exhaust gas introduction cells 12 are located in such a manner that the right angled portions of their right-angled isosceles triangles face one another across the cell partition walls 13. The exhaust gas emission cells 11 and the exhaust gas introduction cells 12 can be arranged without a gap by adequately arranging the rectangular portions and the right-angled isosceles triangular portions of the exhaust gas introduction cells 12.

In regard to the pattern of the exhaust gas emission cells 11 and the exhaust gas introduction cells 12, one cell unit is assumed to be a square drawn with a dotted line Y, which is formed by connecting the centroid of each of four adjacent exhaust gas emission cells 11. The unit includes four exhaust gas introduction cells 12 and parts of exhaust gas emission cells 11 which correspond to one exhaust gas emission cell 11. Thus, the ratio of the number of the exhaust gas introduction cells 12 to the number of the exhaust gas emission cells 11 (exhaust gas introduction cells:exhaust gas emission cells) is 4:1 when the above-described repeating pattern of the exhaust gas emission cells 11 and the exhaust gas introduction cell 12, except for the exceptional cells adjacent to the outer wall, is observed.

Next, the flow of exhaust gas is examined.

First, as shown in FIG. 1(a), exhaust gas flowing toward the honeycomb filter 20 configured as described above flows into the exhaust gas introduction cells 12 each having an open end at the inlet side. Exhaust gas flows into the exhaust gas introduction cells 12 sequentially from a portion where the exhaust gas can easily flow. All the exhaust gas introduction cells 12 have the same cross-sectional shape, and all the exhaust gas introduction cells 12 are formed such that their sides adjacent to the sides forming the cross sections of the exhaust gas emission cells 11 also have the same length. Thus, exhaust gas uniformly flows into the exhaust gas introduction cells 12; passes through cell partition walls 13a separating the exhaust gas emission cell 11 and the exhaust gas introduction cell 12 from each other; and flows into the exhaust gas emission cells 11. Consequently, as shown in FIG. 1(a), a layer of accumulated PM is formed on the cell partition walls 13a.

The flow-through resistance (b) of the exhaust gas introduction cells 12 is slightly high due to the fact that the cross-sectional area of each exhaust gas introduction cell 12 is smaller than the cross-sectional area of each exhaust gas emission cell 11. However, because of the flow-through resistance, the flow rate of exhaust gas flowing into the exhaust gas introduction cells 12 is reduced and becomes uniform, and exhaust gas passes through a wide range of cell partitions walls 13 in the longitudinal direction of the cells of the honeycomb filter and flows into the exhaust gas emission cells 11. In addition, the cross-sectional area of each exhaust gas emission cell 11 is larger than the cross-sectional area of each exhaust gas introduction cell 12. Thus, the effect of reducing the flow-through resistance (e) of the exhaust gas emission cells 11 and the outflow resistance (f) upon flowing of exhaust gas out of the honeycomb filter is high, and as a result, the pressure loss can be reduced, as compared to the conventional honeycomb filter 90 or the like.

Formation of a PM layer having a certain thickness on the cell partition wall 13a results in an increase in the passage resistance (d) upon passage of exhaust gas through the layer of accumulated PM. In contrast, the passage resistance of cell partition walls 13b and 13c separating the exhaust gas introduction cells 12 from each other is not much high because all the exhaust gas introduction cells 12 have the same the cross-sectional area and the number of the exhaust gas introduction cells 12 is four times that of the exhaust gas emission cells 11. Thus, as shown in FIG. 1(b), after a very short period of time, exhaust gas passes through the cell partition walls 13b and 13c separating the exhaust gas introduction cells 12 from each other, and then flows into the exhaust gas emission cells 11. Consequently, a layer of accumulated PM will be formed also on the cell partition walls 13b and 13c. Ultimately, as shown in FIG. 1(b), a layer of accumulated PM having a uniform thickness is formed on the entire cell partition walls 13 (partition walls corresponding to sides 12a, 12b, 12c, 12d, and 12e of the exhaust gas introduction cell) defining the exhaust gas introduction cells 12. In the present invention, as described above, all the exhaust gas introduction cells 12 have the same cross-sectional area, and the number of the exhaust gas introduction cells 12 is four times that of the exhaust gas emission cells 11. As a result, PM accumulates uniformly at an earlier stage, i.e., exhaust gas can easily pass through a greater number of cell partition walls at an early stage. Thus, the initial pressure loss can be reduced.

As a result, problems in driving due to an increase in the pressure loss are less likely to occur throughout the period of use in vehicles carrying the honeycomb filter according to the present invention, and good fuel economy can be achieved.

In the honeycomb filter of the present invention, in the case where the cross-sectional shape of each exhaust gas emission cell and each exhaust gas introduction cell adjacent to each other across the cell partition wall is a polygon in a plane perpendicular to the longitudinal direction of the cells, the following sides are preferably parallel to each other: a side, among the sides forming the cross-sectional shape of each exhaust gas emission cell, that is adjacent to the exhaust gas introduction cell across the cell partition wall; and a side, among the sides forming the cross-sectional shape of the exhaust gas introduction cell, that is adjacent to the exhaust gas emission cell across the cell partition wall.

This indicates that the thickness of the cell partition walls separating the exhaust gas emission cell and the exhaust gas introduction cell from each other is entirely uniform. With the uniform thickness, the filter has high fracture strength, exhaust gas can easily pass through the cell partition walls, and PM can uniformly accumulate on the cell partition walls. Thus, the pressure loss can be reduced.

In the case where the vertexes of the polygon are rounded in a curve in the cross sectional shape, such curved portions are not considered as the sides because these portions do not become parallel.

In a cross section perpendicular to the longitudinal direction of the cells, when straight portions regarded as the sides are hypothetically extended and intersections of these hypothetical straight lines are regarded as hypothetical vertices, the length of the side of the cross-sectional shape excluding the curved portions is preferably 80% or more of the length of a hypothetical side formed by connecting these hypothetical vertices. In other words, the length of a portion not regarded as a side is preferably less than 20% of the length of the hypothetical side.

In the case where the cells each have a polygonal cross-sectional shape in which the length of each side is 80% or more of the length of its hypothetical side, the effect of the present invention, i.e., a reduction in the pressure loss, can be achieved by adjusting the length of the sides.

The honeycomb filter of the present invention is preferably used to purify PM in exhaust gas discharged from internal combustion engines of automobiles. The honeycomb filter can reduce both the initial pressure loss that occurs before accumulation of PM and the transitional pressure loss that occurs in the filter due to accumulation of PMs, and thus can improve engine fuel economy.

The honeycomb filter of the present invention is best suited when diesel engines are used as internal combustion engines in automobiles. It is because the amount of PM discharged from a diesel engine is larger than that from a gasoline engine, and thus, a demand for reducing the transitional pressure loss that occurs in the filter due to accumulation of PM is higher for diesel engines than for gasoline engines.

In the case of using the honeycomb filter of the present invention to purify PM in exhaust gas discharged from internal combustion engines of automobiles, the honeycomb filter of the present invention is fixed inside an exhaust pipe via a holding material.

BRIEF DESCRIPTION OF DRAWINGS

FIG. 4 is an enlarged end face view in which a portion of an end face of the honeycomb fired body shown in FIG. 3(a) and FIG. 3(b) is enlarged.

FIG. 7 is an enlarged end face view in which a portion of an end face of the honeycomb fired body according to the second embodiment of the present invention, which is shown in FIG. 6, is enlarged.

DESCRIPTION OF EMBODIMENTS

Hereinafter, embodiments of the present invention are specifically described. The present invention is not limited to these embodiments, and may be modified within a scope not changing the gist of the present invention.

First Embodiment

The following will describe the first embodiment which is one embodiment of the honeycomb filter of the present invention.

The honeycomb filter according to the first embodiment of the present invention includes a honeycomb fired body. The honeycomb fired body includes porous cell partition walls defining a plurality of cells that serve as channels of exhaust gas, exhaust gas introduction cells each having an open end at an exhaust gas inlet side and a plugged end at an exhaust gas outlet side, exhaust gas emission cells each having an open end at the exhaust gas outlet side and a plugged end at the exhaust gas inlet side, and an outer wall on the periphery thereof.

In addition, the exhaust gas emission cells, except for the cells adjacent to the outer wall, are each adjacently surrounded fully by the exhaust gas introduction cells across the porous cell partition walls; the cells adjacent to the outer wall include the exhaust gas introduction cells and the exhaust gas emission cells; a substantial ratio of the number of the exhaust gas introduction cells to the number of the exhaust gas emission cells (exhaust gas introduction cells: exhaust gas emission cells) is 4:1; and all the exhaust gas introduction cells, except for the cells adjacent to the outer wall, have the same cross-sectional area in a plane perpendicular to the longitudinal direction thereof, the cross-sectional area of each exhaust gas introduction cell being smaller than that of each exhaust gas emission cell in a plane perpendicular to the longitudinal direction thereof.

In the present embodiment, all the exhaust gas introduction cells have the same cross-sectional shape formed by rounding the corners of a pentagon, and the exhaust gas emission cells have a square cross-sectional shape.

The cells adjacent to the outer wall include the exhaust gas introduction cells and the exhaust gas emission cells which are alternately arranged with each other.

In addition, the cross-sectional shape of each exhaust gas introduction cell in a plane perpendicular to the longitudinal direction thereof is entirely uniform from the end at the exhaust gas inlet side to the end at the exhaust gas outlet side excluding the plugged portion; and the cross-sectional shape of each exhaust gas emission cell in a plane perpendicular to the longitudinal direction thereof is entirely uniform from the end at the exhaust gas inlet side to the end at the exhaust gas outlet side excluding the plugged portion.

Figure 2:
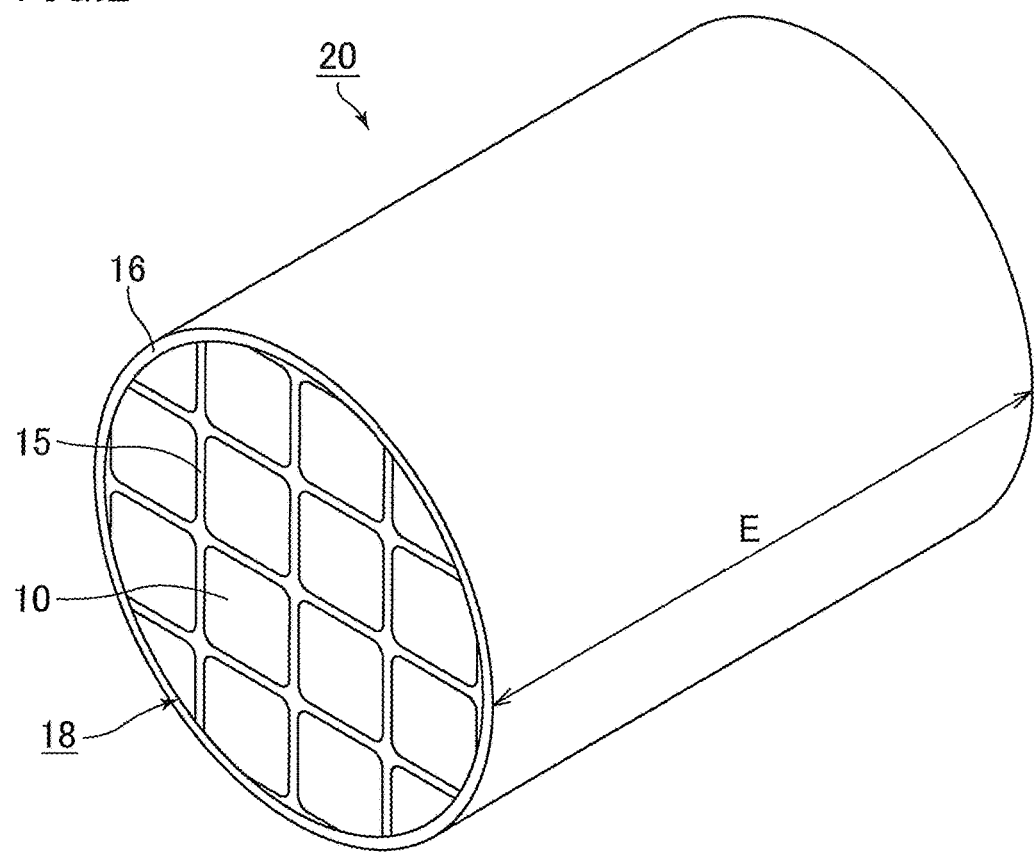
FIG. 2 is a perspective view schematically showing a honeycomb filter according to a first embodiment of the present invention.

FIG. 2 is a perspective view schematically showing the honeycomb filter according to the first embodiment of the present invention.

Figure 3A:
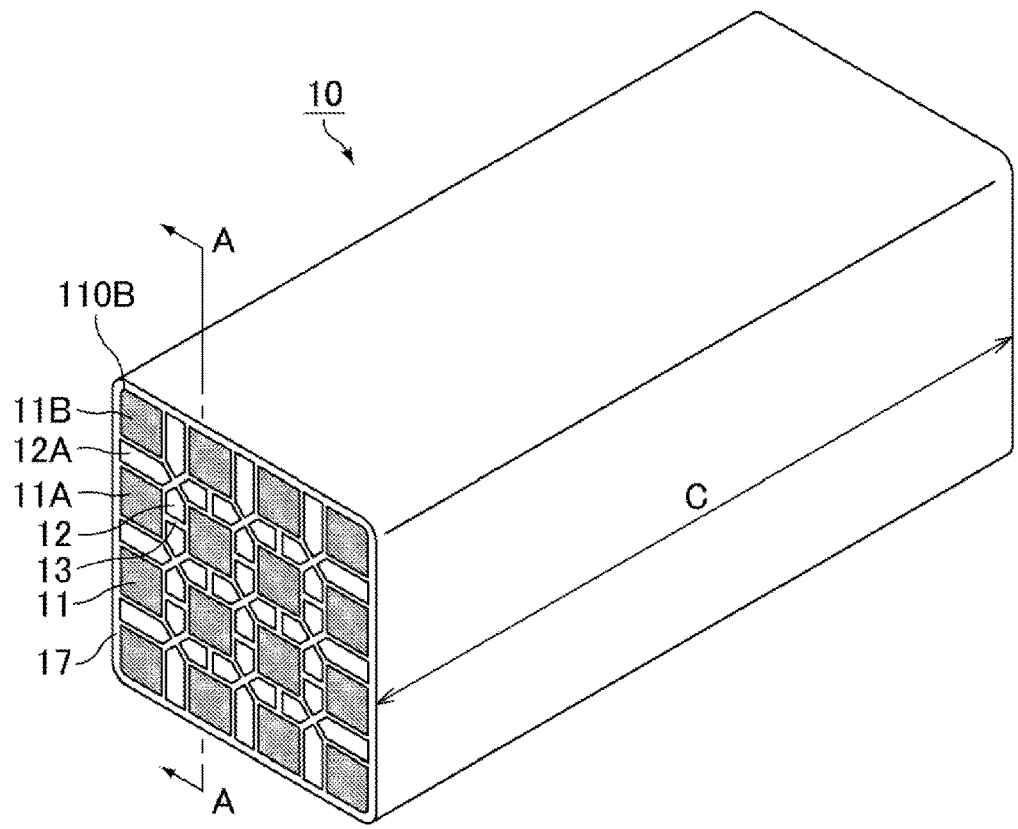
FIG. 3(a) is a perspective view schematically showing an example of a honeycomb fired body constituting the honeycomb filter shown in FIG. 2.
Figure 3B:
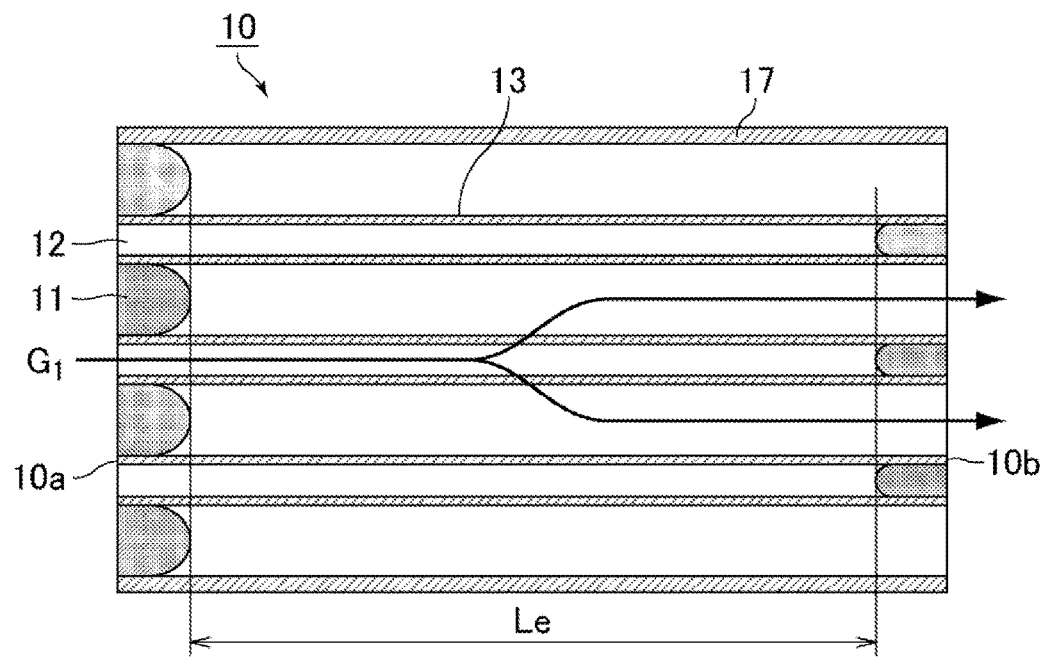
FIG. 3(b) is a cross-sectional view of the honeycomb fired body shown in FIG. 3(a), taken along line A-A.

FIG. 3(a) is a perspective view schematically showing an example of a honeycomb fired body constituting the honeycomb filter shown in FIG. 2. FIG. 3(b) is a cross-sectional view of the honeycomb fired body shown in FIG. 3(a), taken along line A-A. FIG. 4 is an enlarged end face view in which a portion of an end face of the honeycomb fired body shown in FIG. 3(a) and FIG. 3(b) is enlarged.

In the honeycomb filter 20 shown in FIG. 2, a ceramic block 18 is formed by combining a plurality of honeycomb fired bodies 10 with one another with an adhesive layer 15 therebetween, and a peripheral coat layer 16 is formed on the periphery of the ceramic block 18 to prevent leakage of exhaust gas. The peripheral coat layer 16 is optionally formed.

The honeycomb fired body 10 has a substantially rectangular pillar shape, and as shown in FIG. 3(a), the corners of the end faces are rounded in a curve. This prevents damage such as cracks due to concentration of thermal stress at the corners. Alternatively, the corners may be linearly chamfered.

In the honeycomb filter 20 according to the first embodiment, the exhaust gas emission cells 11 each have an open end at the exhaust gas outlet side and a plugged end at the exhaust gas inlet side. The exhaust gas introduction cells 12 each have an open end at the exhaust gas inlet side and a plugged end at the exhaust gas outlet side. The material of the plug material is preferably the same as that of the honeycomb fired body.

In the honeycomb fired body 10 shown in FIG. 3(a) and FIG. 3(b), each exhaust gas emission cell 11 having a square cross section is adjacently surrounded fully by eight exhaust gas introduction cells 12 each having a pentagonal cross section across the porous cell partition walls 13. All the exhaust gas introduction cells 12, except for the cells adjacent to an outer wall 17, have the same shape which is a pentagon with three 90° internal angles and two non-adjacent 135° internal angles. All the exhaust gas emission cells 11, except for the cells adjacent to the outer wall 17, also have the same shape.

Figure 1A:
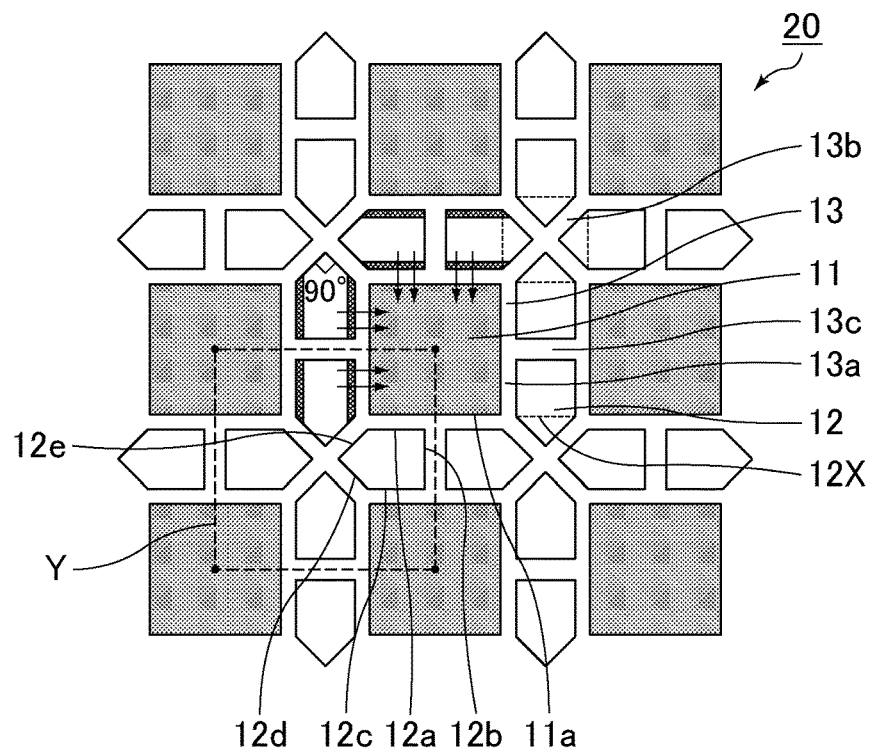
FIG. 1(a) and FIG. 1(b) are each an enlarged end face view in which a portion of an end face of a honeycomb filter according to one embodiment of the present invention is enlarged.
Figure 1B:
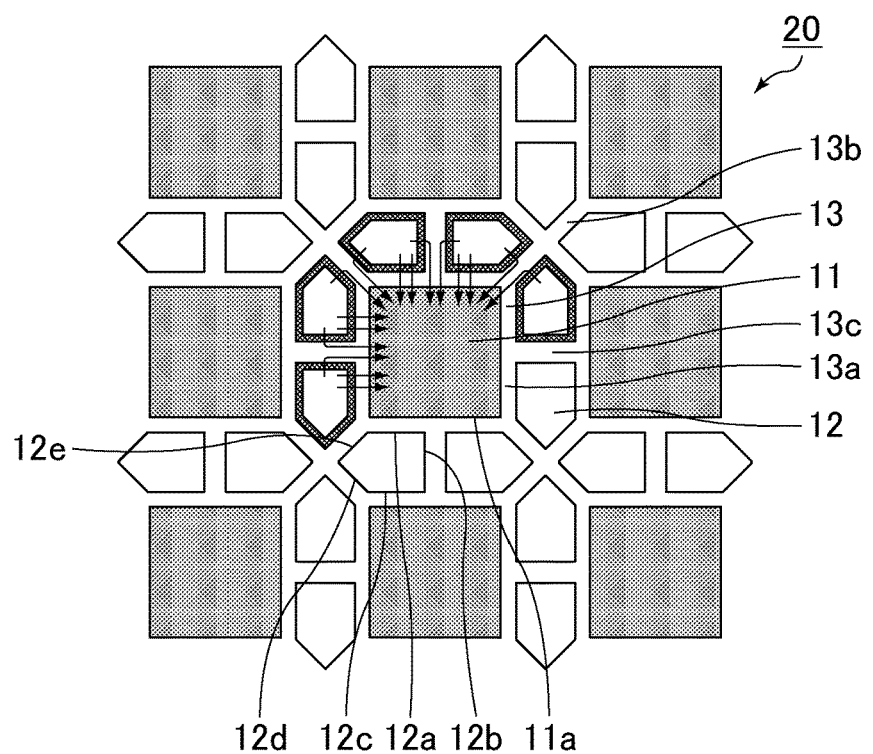

As shown in FIG. 1(a), when a square formed by connecting the centroid of each of four adjacent exhaust gas emission cells 11 is considered as one unit of this pattern of arrangement, this unit includes four exhaust gas introduction cells 12 in such a manner that the right angled portions of their right-angled isosceles triangles face one another at the center of the unit, forming a cross shape. Four ¼ portions of the exhaust gas emission cells 11 are respectively located at the four empty corners of the square. Thus, the number of the exhaust gas introduction cells 12 is four times that of the exhaust gas emission cells 11. All the exhaust gas introduction cells 12 have the same cross-sectional area.

The outer wall 17 has corners, and exhaust gas introduction cells 12A and exhaust gas emission cells 11A each have a side in contact with the outer wall 17 in a cross section perpendicular to longitudinal direction of the cells, the side being straight and parallel to a side defining the outer periphery of the outer wall 17, so that the thickness of the outer wall 17 excluding the corners is uniform.

In regard to the cells adjacent to an outer wall 17, the exhaust gas introduction cells 12A and the exhaust gas emission cells 11A are alternately arranged with each other, and the exhaust gas introduction cells 12A are pentagonal. The area of the rectangular portion of the pentagonal cell is large as compared to the exhaust gas introduction cells 12 not adjacent to the outer wall 17. In contrast, the area of each exhaust gas emission cell 11A adjacent to the outer wall 17 is substantially the same as the area of each exhaust gas emission cell 11 not adjacent to the outer wall 17.

The area of each exhaust gas emission cell 11A adjacent to the outer wall 17 is preferably 65 to 90%, more preferably 70 to 85%, of the area of each exhaust gas emission cell 11 other than the exhaust gas emission cells 11A adjacent to the outer wall 17.

In addition, the area of each exhaust gas introduction cell 12A adjacent to the outer wall 17 is preferably 130 to 200%, more preferably 150 to 180%, of the area of each exhaust gas introduction cell 12 other than the exhaust gas introduction cells 12A adjacent to the outer wall 17.

Exhaust gas emission cells 11B located at the corners of the honeycomb fired body 10 each have a substantially square shape with a rounded portion 110B in a curve. The rounded portion 110B of the exhaust gas emission cell 11B shown in FIG. 3(a) is a corner that is rounded in a curve, but the corner may be linearly chamfered. The cross-sectional area of each exhaust gas emission cell 11B is substantially the same as that of each exhaust gas emission cell 11 not adjacent to the outer wall 17.

In the honeycomb filter of the present embodiment, as described above, the flow-through resistance of the exhaust gas introduction cells 12 is slightly high due to the fact that the cross-sectional area of each exhaust gas introduction cell 12 is smaller than the cross-sectional area of each exhaust gas emission cell 11. However, because of the flow-through resistance, the flow rate of exhaust gas flowing into the exhaust gas introduction cells 12 is reduced and becomes uniform, and exhaust gas passes through a wide range of cell partitions walls 13 in the longitudinal direction of the cells of the honeycomb filter and flows into the exhaust gas emission cells 11. In addition, the aperture ratio of the exhaust gas introduction cells 12 in the honeycomb filter 20 is higher than the aperture ratio of the exhaust gas emission cells 11 in the honeycomb filter 20, and the cross-sectional area of each exhaust gas emission cell 11 is larger than the cross-sectional area of each exhaust gas introduction cell 12. Thus, the effect of reducing the flow-through resistance (e) of the exhaust gas emission cells 11 and the outflow resistance (f) upon flowing of exhaust gas out of the honeycomb filter is high, and as a result, the pressure loss can be reduced, as compared to the conventional honeycomb filter 90.

Generally, at an early stage, a layer of accumulated PM is mainly formed on the cell partition walls 13 separating the exhaust gas introduction cell 12 and the exhaust gas emission cell 11 from each other, specifically on the cell partition walls 13 on the exhaust gas introduction cell 12 side. After a very short period of time, exhaust gas enters the cell partition walls 13 separating the exhaust gas introduction cells 12 from each other, and then passes through the cell partition walls 13 into the exhaust gas emission cells 11. Thus, PM gradually accumulates also on the cell partition walls 13 separating the exhaust gas introduction cells 12 from each other. As a result, PM accumulates substantially uniformly on the entire cell partition walls 13 defining the exhaust gas introduction cells 12. In the present invention, PM accumulates uniformly at an earlier stage, i.e., exhaust gas can easily pass through a greater number of cell partition walls 13 at an early stage. Thus, the initial pressure loss can be reduced.

In addition, all the exhaust gas introduction cells 12, except for the cells adjacent to the outer wall, have the same cross-sectional area in a plane perpendicular to the longitudinal direction thereof, the cross-sectional area of each exhaust gas introduction cell being smaller than that of each exhaust gas emission cell in a plane perpendicular to the longitudinal direction thereof. However, the ratio of the number of the exhaust gas introduction cells to the number of the exhaust gas emission cells (exhaust gas introduction cells:exhaust gas emission cells) is 4:1. Thus, the total volume of the exhaust gas introduction cells 12 is large, and a substantial filtration area can be made sufficiently large. Also, the layer of PM accumulated on the cell partition walls 13 defining the exhaust gas introduction cells 12 is thin, and the passage resistance (d) upon passage of exhaust gas through the layer of accumulated PM is kept low. As a result, the present invention can provide a honeycomb filter in which the pressure loss at an early stage is low and the pressure loss is less likely to increase even after accumulation of PM.

Owing to the above-described configuration of the outer wall 17 and its adjacent exhaust gas emission cells 11 and exhaust gas introduction cells 12, the honeycomb filter 20 according to the first embodiment achieves the following effects in addition to the effects described above: the outer wall 17 increases the strength of the honeycomb fired bodies 10, further reduces local variations in the volume ratio between the exhaust gas emission cells 11 and the exhaust gas introduction cells 12 in the honeycomb fired bodies 10, and thus allows exhaust gas to flow more uniformly. Also, exhaust gas can smoothly flow into the exhaust gas introduction cells 12 even near the outer wall 17, and the cell partition walls 13 and the outer wall 17 can function as filters, so that the pressure loss can be further reduced.

In regard to the shapes of the cells, in the honeycomb fired body 10 shown in FIG. 3(a) and FIG. 3(b) which constitutes a honeycomb filter, the exhaust gas emission cells 11, 11A, and 11B respectively have square, rectangular, and partially-rounded square cross sections, and the exhaust gas introduction cells 12 and 12A have pentagonal cross sections. Yet, the cross-sectional shapes of exhaust gas emission cells and the exhaust gas introduction cells constituting the honeycomb filter of the present invention are not limited to the above shapes. For example, the cross-sectional shape of the exhaust gas emission cells may be a polygon other than the square. Specifically, the cross-sectional shape of the exhaust gas emission cells may be an octagon. The cross-sectional shape of the exhaust gas introduction cells may also be a polygon other than the pentagon. Specifically, the cross-sectional shape of the exhaust gas introduction cells may be a rectangle or a hexagon.

In addition, the vertexes of the exhaust gas emission cells and exhaust gas introduction cells each having a polygonal cross section such as a square may be rounded in a curve in the cross section.

The curve may be a curve (arc) obtained when a circle is divided into quarters or a curve obtained when an ellipse is divided into quarters with the major axis and a straight line perpendicular to the major axis, for example. It is particularly preferred that the vertexes of a cell having a square cross section are rounded in a curve. This prevents cracking in the cell partition walls due to concentration of stress at the corners.

In addition, the honeycomb filter 20 may include, if necessary, some cells each having a cross section that includes a curve such as an arc which is a part of a circle.

In the honeycomb filters shown in FIG. 2, FIG. 3(a), and FIG. 3(b), the ratio (%) of the cross-sectional area of each exhaust gas introduction cell 12 relative to the cross-sectional area of each exhaust gas emission cell is preferably 30 to 50%, more preferably 35 to 45%.

In the honeycomb filter of the present invention, the thickness of the cell partition walls in the honeycomb filter is preferably 0.075 to 0.310 mm, more preferably 0.10 to 0.28 mm.

The cell partition walls having a thickness of less than 0.075 mm are so thin that the mechanical strength of the honeycomb filter is reduced. In contrast, the cell partition walls having a thickness of more than 0.310 mm are so thick that the pressure loss upon passage of exhaust gas through the cell partition walls is increased.

In the honeycomb filter of the present invention, the porosity of the cell partition wall is preferably 40 to 65%.

The cell partition walls having a porosity of 40 to 65% can successfully capture PM in exhaust gas, and the pressure loss due to the cell partition walls can be kept low. Thus, the present invention can provide a honeycomb filter in which the initial pressure loss is low and the pressure loss is less likely to increase even after accumulation of PM.

If the cell partition walls have a porosity of less than 40%, the ratio of pores in the cell partition walls is so small that exhaust gas cannot easily pass through the cell partition walls, and the pressure loss upon passage of exhaust gas through the cell partition walls is increased. In contrast, cell partition walls having a porosity of more than 65% have poor mechanical characteristics and is susceptible cracking during regeneration or the like. The pore diameter and the porosity are measured by mercury porosimetry with a contact angle of 130° and a surface tension of 485 mN/m.

In the honeycomb filter of the present invention, the average pore diameter of the pores in the cell partition walls is preferably 8 to 25 μm.

The honeycomb filter configured as described above can capture PM with high capturing efficiency while suppressing an increase in the pressure loss. If the average pore diameter of the pores contained in the cell partition walls is less than 8 μm, the pores are so small that the pressure loss upon passage of exhaust gas through the cell partition walls is increased. In contrast, if the average pore diameter of the pores contained in the cell partition walls is more than 25 μm, the pore diameter is so large that the PM capturing efficiency is decreased.

The honeycomb filter of the present invention may include a plurality of honeycomb fired bodies or a single honeycomb fired body. Examples of materials of the honeycomb fired body include carbide ceramics such as silicon carbide, titanium carbide, tantalum carbide, and tungsten carbide; nitride ceramics such as aluminum nitride, silicon nitride, boron nitride, and titanium nitride; oxide ceramics such as alumina, zirconia, cordierite, mullite, and aluminum titanate; and silicon-containing silicon carbide. Silicon carbide or silicon-containing silicon carbide is preferred among these, because these materials are excellent in properties such as heat resistance, mechanical strength, and thermal conductivity.

The silicon-containing silicon carbide is a mixture of silicon carbide and silicon metal, and is preferably silicon-containing silicon carbide containing 60 wt % or more of silicon carbide.

The number of the cells per unit area in a cross section of the honeycomb fired body 10 is preferably 31 to 62 pcs/cm$^2$ (200 to 400 pcs/inch$^2$).

The honeycomb filter of the present invention 20 is preferably formed by combining a plurality of honeycomb fired bodies each having an outer wall on the periphery thereof, with an adhesive layer therebetween. In the case where the honeycomb filter is formed by combining a plurality of honeycomb fired bodies with an adhesive layer therebetween as described above, the adhesive layer that combines the honeycomb fired bodies is prepared by applying an adhesive paste containing an inorganic binder and inorganic particles and drying the adhesive paste. The adhesive layer may further contain inorganic fibers and/or whiskers. The thickness of the adhesive layer is preferably 0.5 to 2.0 mm.

The honeycomb filter according to the first embodiment of the present invention may include a peripheral coat layer on the periphery of the honeycomb filter. The material of the peripheral coat layer is preferably the same as that of the adhesive.

The thickness of the peripheral coat layer is preferably 0.1 to 3.0 mm.

The following will describe a method for manufacturing the honeycomb filter of the present invention.

A silicon carbide is used as ceramic powder in the method described below.

(1) A honeycomb molded body is manufactured by extruding a wet mixture containing ceramic powder and a binder (extrusion molding step).

Specifically, first, silicon carbide powders having different average particle sizes serving as ceramic powder, an organic binder, a liquid plasticizer, a lubricant, and water are mixed to prepare a wet mixture for manufacturing a honeycomb molded body.

The wet mixture may contain, if necessary, a pore-forming agent such as balloons that are fine hollow spheres formed of oxide-based ceramics, spherical acrylic particles, or graphite.

Any balloons may be used. Examples thereof include alumina balloon, glass micro balloon, shirasu balloon, fly ash balloon (FA balloon), and mullite balloon. Alumina balloon is preferable among these.

Subsequently, the wet mixture is fed into an extrusion machine and extruded into a honeycomb molded body having a predetermined shape.

At this point, a honeycomb molded body is manufactured using a die that can make a cross-sectional shape having the cell structures (shapes and arrangement of the cells) shown in FIG. 2, FIG. 3(a), and FIG. 3(b).

(2) The honeycomb molded body is cut into a predetermined length and dried with a drying apparatus such as a microwave drying apparatus, a hot-air drying apparatus, a dielectric drying apparatus, a reduced-pressure drying apparatus, a vacuum drying apparatus, or a freeze drying apparatus. Then, predetermined cells are plugged by placing a plug material paste that serves as a plug material (plugging step).

The wet mixture can be used as the plug material paste.

(3) The honeycomb molded body is heated at 300° C. to 650° C. in a degreasing furnace to remove organic matter in the honeycomb molded body (degreasing process). Subsequently, the degreased honeycomb molded body is transferred to a firing furnace and fired at 2000° C. to 2200° C. (firing process), whereby the honeycomb fired body as shown in FIG. 2, FIG. 3(a), and FIG. 3(b) is manufactured.

The plug material paste placed at the end of each cell is fired by heat into a plug material.

Conventional conditions for manufacturing honeycomb fired bodies can be applied to cutting, drying, plugging, degreasing, and firing.

(4) A single honeycomb fired body manufactured by the above steps may be used as-is as a honeycomb filter. However, when silicon carbide is used as ceramic powder, it is preferred that a plurality of honeycomb fired bodies are combined with one another with an adhesive layer therebetween.

In such a case, a plurality of honeycomb fired bodies are stacked in series with an adhesive paste therebetween on a support table, and the honeycomb fired bodies are combined with one another (combining step), whereby a honeycomb aggregated body including a plurality of stacked honeycomb fired bodies is manufactured.

The adhesive paste contains, for example, an inorganic binder, an organic binder, and inorganic particles. The adhesive paste may further contain inorganic fibers and/or whiskers.

Examples of the inorganic particles contained in the adhesive paste include carbide particles and nitride particles. Specific examples thereof include silicon carbide particles, silicon nitride particles, and boron nitride particles. These may be used alone or in combination of two or more thereof. The inorganic particles are preferably silicon carbide particles having excellent thermal conductivity.

Examples of the inorganic fibers and/or whiskers contained in the adhesive paste include inorganic fibers and/or whiskers made of silica-alumina, mullite, alumina, silica, or the like. These may be used alone or in combination of two or more thereof. The inorganic fibers are preferably alumina fibers. Alternatively, the inorganic fibers may be biosoluble fibers.

The adhesive paste may contain, if necessary, balloons that are fine hollow spheres formed of oxide-based ceramics, spherical acrylic particles, and graphite. Any balloons may be used. Examples thereof include alumina balloon, glass micro balloon, shirasu balloon, fly ash balloon (FA balloon), and mullite balloon.

(5) Subsequently, the honeycomb aggregated body is heated to solidify the adhesive paste into an adhesive layer, whereby a rectangular pillar-shaped ceramic block is manufactured.

Conventional conditions for manufacturing honeycomb filters can be applied to heating and solidifying of the adhesive paste.

(6) The ceramic block is subjected to cutting (cutting step).

Specifically, the periphery of the ceramic block is cut with a diamond cutter, whereby a ceramic block formed in a substantially round pillar shape is manufactured.

(7) A peripheral coat material paste is applied to the peripheral face of the substantially round pillar-shaped ceramic block, and is dried and solidified to form a peripheral coat layer (peripheral coat layer forming step).

The adhesive paste may be used as the peripheral coat material paste. Alternatively, a paste having a composition different from the adhesive paste may be used as the peripheral coat paste.

The peripheral coat layer is optional and is not necessarily formed.

The peripheral coat layer helps to adjust the peripheral shape of the ceramic block to provide a round pillar-shaped honeycomb filter.

The honeycomb filter including the honeycomb fired bodies can be manufactured through the above steps.

In the above steps, a honeycomb filter having a predetermined shape is manufactured through the cutting step. However, a honeycomb filter having a predetermined shape such as a round pillar shape may be obtained by manufacturing various shapes of honeycomb fired bodies each having an outer wall on the entire periphery in the step of manufacturing a honeycomb fired body, and combining these various shapes of honeycomb fired bodies with one another with an adhesive layer therebetween. In this case, the cutting step can be omitted.

Hereinafter, the effects of the honeycomb filter of the present invention are listed.

(1) In the honeycomb filter of the present embodiment, each exhaust gas emission cell is surrounded fully by the exhaust gas introduction cells across the porous cell partition walls. Thus, the cell partition walls surrounding the exhaust gas emission cell can be entirely used.

(2) In the honeycomb filter of the present embodiment, the flow-through resistance (b) of the exhaust gas introduction cells is slightly high due to the fact that the cross-sectional area of each exhaust gas introduction cell is smaller than the cross-sectional area of each exhaust gas emission cell. However, because of the flow-through resistance, the flow rate of exhaust gas flowing into the exhaust gas introduction cells is reduced and becomes uniform, and exhaust gas passes through a wide range of cell partitions walls in the longitudinal direction of the cells of the honeycomb filter and flows into the exhaust gas emission cells. In addition, the cross-sectional area of each exhaust gas emission cell is larger than the cross-sectional area of each exhaust gas introduction cell. Thus, the effect of reducing the flow-through resistance (e) of the exhaust gas emission cells and the outflow resistance (f) upon flowing of exhaust gas out of the honeycomb filter is high, and as a result, the pressure loss can be reduced, as compared to the conventional honeycomb filters.

(3) In the honeycomb filter of the present embodiment, all the exhaust gas introduction cells 12 have the same cross-sectional area, and the number of the exhaust gas introduction cells 12 is four times that of the exhaust gas emission cells 11. As a result, PM accumulates uniformly at an earlier stage, i.e., exhaust gas can easily pass through a greater number of cell partition walls at an early stage. Thus, the initial pressure loss can be reduced.

(4) In addition, in the honeycomb filter of the present embodiment, all the exhaust gas introduction cells 12 have the same cross-sectional area, and the number of the exhaust gas introduction cells 12 is four times that of the exhaust gas emission cells 11. Thus, the total volume of the exhaust gas introduction cells is large, and a substantial filtration area can be made sufficiently large. Also, the layer of PM accumulated on the cell partition walls defining the exhaust gas introduction cells is thin, and the passage resistance (d) upon passage of exhaust gas through the layer of accumulated PM is kept low. As a result, the present invention can provide a honeycomb filter in which the initial pressure loss is low and the pressure loss is less likely to increase even after accumulation of PM.

(5) The honeycomb filter of the present embodiment has a structure in which the cross-sectional area of each exhaust gas emission cell in a plane perpendicular to the longitudinal direction thereof is larger than the cross-sectional area of each exhaust gas introduction cell in a plane perpendicular to the longitudinal direction thereof, and the cells adjacent to the outer wall include exhaust gas introduction cells and exhaust gas emission cells which are alternately arranged with each other. Thus, exhaust gas flows easily from the exhaust gas introduction cells adjacent to the outer wall to the exhaust gas emission cells each having a large cross-sectional area, and exhaust gas can flow not only through partition walls that define the exhaust gas introduction cells adjacent to the outer wall but also the outer wall that defines the exhaust gas introduction cells. Thus, a substantial filtration area can be maximized. This makes it possible to provide a honeycomb filter in which the initial pressure loss is lower and the pressure loss is further less likely to increase even after accumulation of PM.

(6) In the honeycomb filter of the present embodiment, in a cross section perpendicular to the longitudinal direction of the cells, all the exhaust gas introduction cells are pentagonal and the exhaust gas emission cells are square or octagonal; a substantial ratio of the number of the exhaust gas introduction cells to the number of the exhaust gas emission cells (exhaust gas introduction cells:exhaust gas emission cells) is 4:1; and all the exhaust gas introduction cells, except for the exhaust gas introduction cells adjacent to the outer wall, have the same shape. This allows PM to uniformly accumulate on all the exhaust gas introduction cells throughout the period from the early stage until the amount of accumulated PM is close to the limit. As a result, the layer of PM accumulated on the exhaust gas introduction cells is uniformly thin, and the pressure loss is further less likely to increase. In addition, ash remaining in the exhaust gas introduction cells after burning of PM tends to uniformly accumulate in the honeycomb filter, so that exhaust gas tends to more uniformly flow into the honeycomb filter even after accumulation of ash, and thus the pressure loss after accumulation of ash can also be reduced.

(7) In the honeycomb filter of the present embodiment, in a cross section perpendicular to the longitudinal direction of the cells, all the exhaust gas introduction cells are pentagonal, and the exhaust gas emission cells are square or octagonal. Thus, it is possible to easily design the cross-sectional shape of the honeycomb fired body constituting the honeycomb filter and to form the exhaust gas introduction cells each having a wider filtration area. Thus, a honeycomb filter in which the pressure loss is lower can be provided.

(8) In the honeycomb filter of the present embodiment, silicon carbide or silicon-containing silicon carbide can be used as a material of the honeycomb fired body. Thus, a honeycomb filter having excellent heat resistance can be provided.

(9) In the honeycomb filter of the present invention, the thickness of the cell partition walls separating the cells of the honeycomb filter from each other is entirely uniform. This allows exhaust gas to more uniformly pass through the entire cell partition walls, resulting in uniform accumulation of PM. Thus, the pressure loss can be reduced.

(10) In the honeycomb filter of the present invention, when a plurality of honeycomb fired bodies are combined with one another with an adhesive layer therebetween, the adhesive layer acts as a buffer layer during regeneration or the like, preventing the honeycomb filter from being destroyed by thermal stress. The adhesive layer can also increase the mechanical strength.

(11) In the honeycomb filter of the present invention, the cell partition walls are made as thin as 0.075 mm to 0.310 mm, so that the passage resistance upon passage of exhaust gas through the cell partition walls can be reduced, and the pressure loss can be further reduced.

The following will describe examples that more specifically disclose the first embodiment of the present invention. The present invention is not limited to these examples.

Example 1

A mixture was obtained by mixing 52.8% by weight of silicon carbide coarse powder having an average particle size of 22 µm and 22.6% by weight of silicon carbide fine powder having an average particle size of 0.5 µm. To the mixture were added 4.6% by weight of an organic binder (methylcellulose), 0.8% by weight of a lubricant (UNILUB, manufactured by NOF Corporation), 1.3% by weight of glycerin, 1.9% by weight of a pore-forming agent (acrylic resin), 2.8% by weight of oleic acid, and 13.2% by weight of water. These components were kneaded to obtain a wet mixture. Subsequently, the wet mixture was extruded (extrusion molding step).

In this step, a raw honeycomb molded body having the same shape as the honeycomb fired body 10 shown in FIG. 3(a) with the cells unplugged was manufactured.

Then, the raw honeycomb molded body was dried using a microwave drying apparatus to obtain a dried honeycomb molded body. Subsequently, predetermined cells of the dried honeycomb molded body were plugged by placing a plug material paste.

Specifically, the cells were plugged at the end of the exhaust gas inlet side and at the end of the exhaust gas outlet side at positions shown in FIG. 3(a).

The wet mixture was used as the plug material paste. After plugging the cells, the dried honeycomb molded body with the plug material paste placed in the cells was dried again with a drying apparatus.

Subsequently, the dried honeycomb molded body with the plugged cells was degreased at 400° C. (degrease treatment), and further fired at 2200° C. in an argon atmosphere at normal pressure for three hours (firing treatment).
In this manner, a rectangular pillar-shaped honeycomb fired body was manufactured.

The length of sides and the cross-sectional area can be measured using the electron microscope and the measurement software such as image analysis and grain size distribution measurement software (Mac-View (Version 3.5), produced by Mountech Co. Ltd.) described above.

The manufactured honeycomb fired body was the honeycomb fired body 10 shown in FIG. 3(a) and FIG. 3(b) formed of a silicon carbide sintered body in which the porosity was 45%, the average pore diameter was 15 µm, the size was 34.3 mm×34.3 mm×150 mm, the number of cells per unit area (cell density) was 345 pcs/inch$^2$, and the thickness of the cell partition walls 13 was 0.25 mm.

In a cross section of the manufactured honeycomb fired body 10 in a plane perpendicular to the longitudinal direction of the cells, each exhaust gas emission cell 11 was adjacently surrounded fully by the exhaust gas introduction cells 12.

The cross-sectional shape of each of the exhaust gas introduction cells 12 and 12A was a pentagon with three adjacent 90° internal angles and two non-adjacent 135° internal angles. In regard to the sides forming the cross-sectional shape of the exhaust gas introduction cells 12, the length of the side 12a was 0.700 mm, the length of the side 12b was 0.972 mm, and the length of the side 12d was 0.687 mm. Each exhaust gas introduction cell 12 had a cross-sectional area of 0.916 mm$^2$. In regard to the exhaust gas introduction cells 12A adjacent to the outer wall 17, the length of a side 12f was 1.311 mm, and the cross-sectional area of each exhaust gas introduction cell 12A was 1.510 mm$^2$ (see FIG. 4).

The cross-sectional shape of each exhaust gas emission cell 11 was a square, the length of the side 11a was 1.503 mm, and the cross-sectional area of each exhaust gas emission cell 11 was 2.259 mm$^2$.

Each exhaust gas emission cell 11B located at the four corners of the honeycomb fired body 10 had a cross-sectional area of 1.478 mm$^2$.

In contrast, in regard to the exhaust gas emission cells 11A, the length of a side 11Aa perpendicular to the outer wall 17 was 1.237 mm.

In addition, the aperture ratio of the exhaust gas introduction cells 12 in the honeycomb filter was 39.9%, and the aperture ratio of the exhaust gas emission cells of the honeycomb filter was 26.0%.

The honeycomb fired body 10 had a rectangular pillar shape in which the corners of the end face were rounded in a curve.

Subsequently, a plurality of honeycomb fired bodies were combined with one another using an adhesive paste containing 30% by weight of alumina fibers having an average fiber length of 20 µm, 21% by weight of silicon carbide particles having an average particle size of 0.6 µm, 15% by weight of silica sol, 5.6% by weight of carboxymethyl cellulose, and 28.4% by weight of water. Further, the adhesive paste was dried and solidified at 120° C. to form an adhesive layer, whereby a rectangular pillar-shaped ceramic block was manufactured.

Subsequently, the periphery of the rectangular pillar-shaped ceramic block was cut out using a diamond cutter, whereby a substantially round pillar-shaped ceramic block was manufactured.

Subsequently, a sealing material paste having the same composition as the adhesive paste was applied to the peripheral face of the ceramic block. The sealing material paste was dried and solidified at 120° C. to form a peripheral coat layer, whereby a round pillar-shaped honeycomb filter was manufactured.

The aperture ratio of the exhaust gas introduction cells 12 in the honeycomb filter was 37.3%, and the aperture ratio of the exhaust gas emission cells 11 in the honeycomb filter was 24.3%.

The honeycomb filter had a diameter of 143.8 mm and a longitudinal length of 150 mm.

Comparative Example 1

Figure 12A:
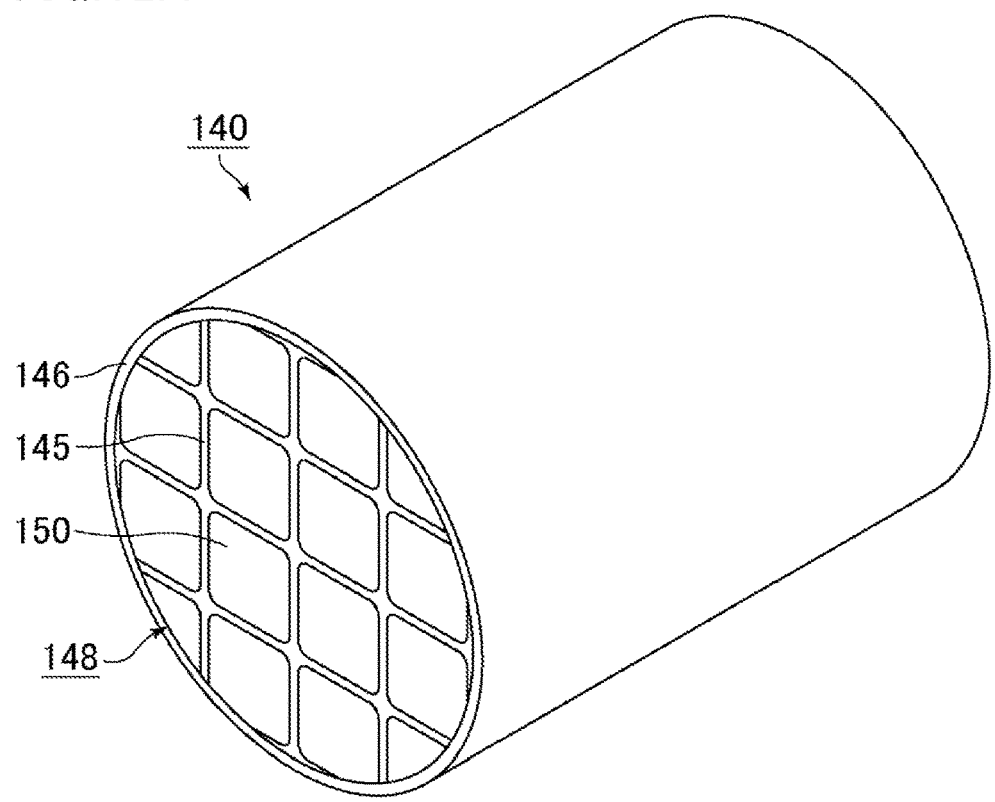
FIG. 12(a) is a perspective view schematically showing a honeycomb filter according to a comparative example.
Figure 12B:
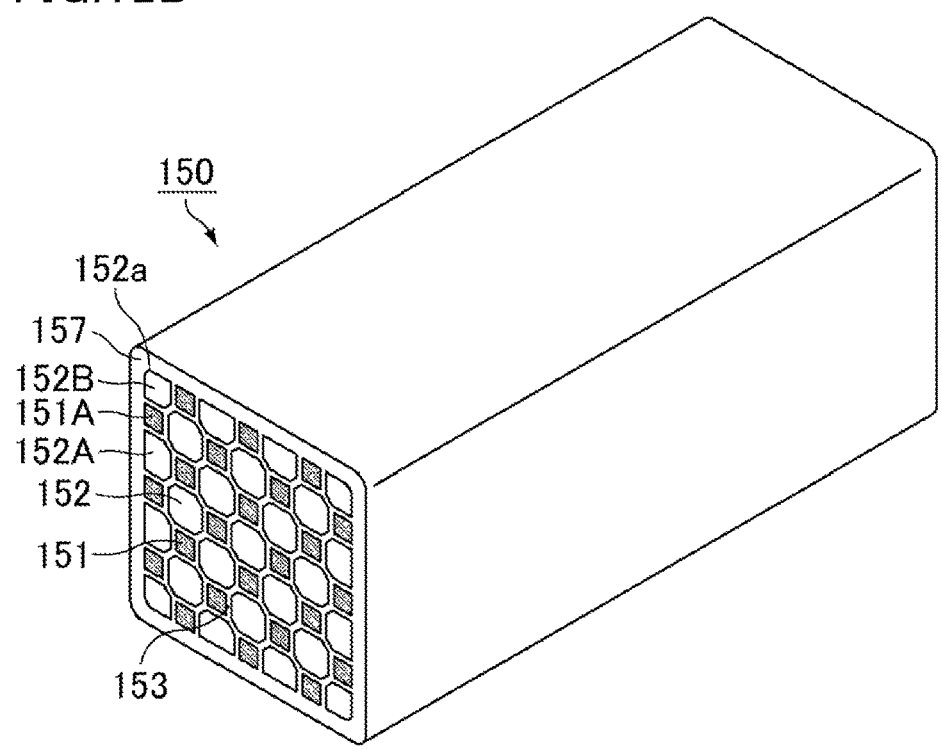
FIG. 12(b) is a perspective view schematically showing a honeycomb fired body constituting the honeycomb filter shown in FIG. 12(a).

The extrusion molding step was performed as in Example 1 to obtain a raw honeycomb molded body, except that the cross-sectional shapes of the exhaust gas introduction cells and the exhaust gas emission cells were patterned as shown in FIG. 12(b) and that the cells were not plugged. Then, the raw honeycomb molded body was dried using a microwave drying apparatus to obtain a dried honeycomb molded body. Subsequently, predetermined cells of the dried honeycomb molded body were plugged by placing a plug material paste. The cells were plugged at positions as shown in FIG. 12(b).

As a result, a honeycomb molded body in which the cells were plugged at the end of the exhaust gas inlet side and at the end of the exhaust gas outlet side at positions as shown in FIG. 12(b) was obtained.

Subsequently, the steps as in Example 1 were performed to manufacture a honeycomb fired body 150 shown in FIG. 12(a) and FIG. 12(b), and a honeycomb filter 140 was manufactured.

In a cross section of the manufactured honeycomb fired body 150 in a plane perpendicular to the longitudinal direction of the cells, all the exhaust gas introduction cells 152 except for exhaust gas introduction cells 152A and 152B adjacent to an outer wall 157 were octagonal.

The sides facing exhaust gas emission cells 151 were vertical or horizontal sides, each having a length of 1.11 mm.

The other sides facing the exhaust gas introduction cells 152, 152A, and 152B were hypotenuse sides, each having a length of 0.27 mm.

All the exhaust gas emission cells 151 and 151A were square, and the length of the sides forming the cross-sectional shape of the exhaust gas emission cells 151 and 151A was 0.96 mm.

In regard to each exhaust gas introduction cell 152B located at the four corners, the length of a side in contact with the outer wall 157 was 1.23 mm, the length of a vertical or horizontal side was 1.04 mm, the length of a hypotenuse side was 0.27 mm, and the cross-sectional area was 1.48 mm$^2$.

In contrast, in regard to each exhaust gas introduction cell 152A, the length of a side in contact with the outer wall 157 was 1.49 mm, the length of a vertical side parallel to the side in contact with the outer wall 157 was 1.11 mm, the length of a horizontal side connected at a right angle to the side in contact with the outer wall 157 was 1.04 mm, the length of a hypotenuse side was 0.27 mm, and the cross-sectional area was 1.79 mm$^2$.

The thickness of the cell partition walls 153 was 0.25 mm, and the thickness of the outer wall 157 was 0.35 mm.

The cross-sectional area of each exhaust gas introduction cell 152 was 2.17 mm$^2$, and the cross-sectional area of each exhaust gas emission cell 151 was 0.93 mm$^2$. Specifically, the cross-sectional area of each exhaust gas introduction cell 152 was larger than the cross-sectional area of each exhaust gas emission cell 151.

Comparative Example 2

Figure 11:
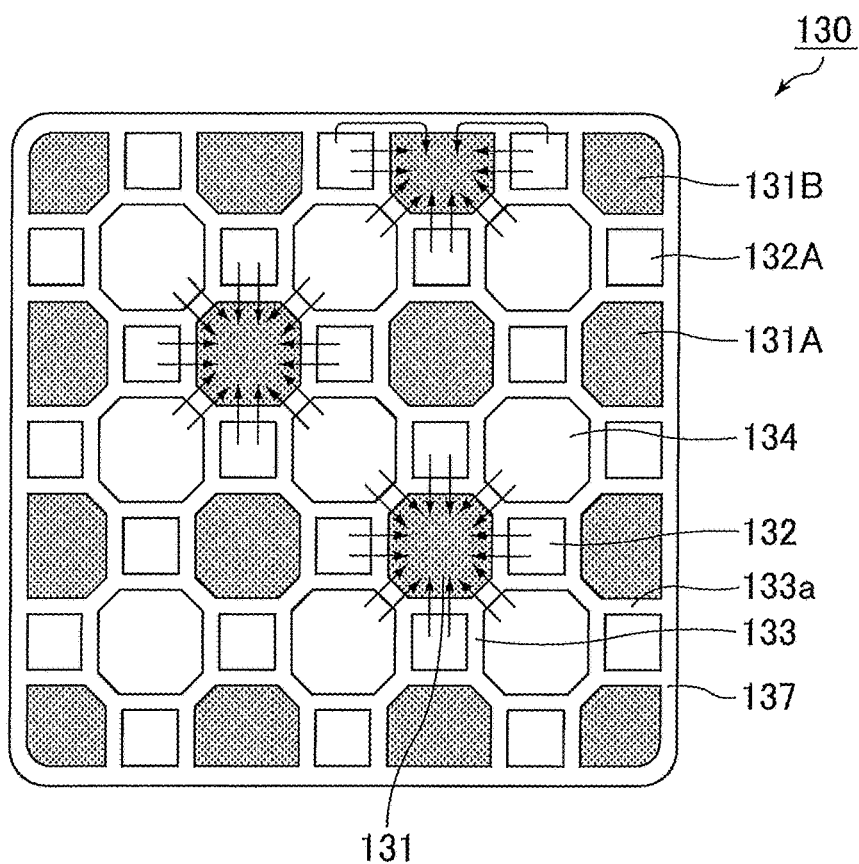
FIG. 11 is a cross-sectional view schematically showing a cross section of a honeycomb fired body constituting a honeycomb filter disclosed in Patent Literature 4.

Honeycomb fired bodies and a honeycomb filter were manufactured as in Comparative Example 1, except that the cells were plugged at positions shown in FIG. 11.

Figure 5:
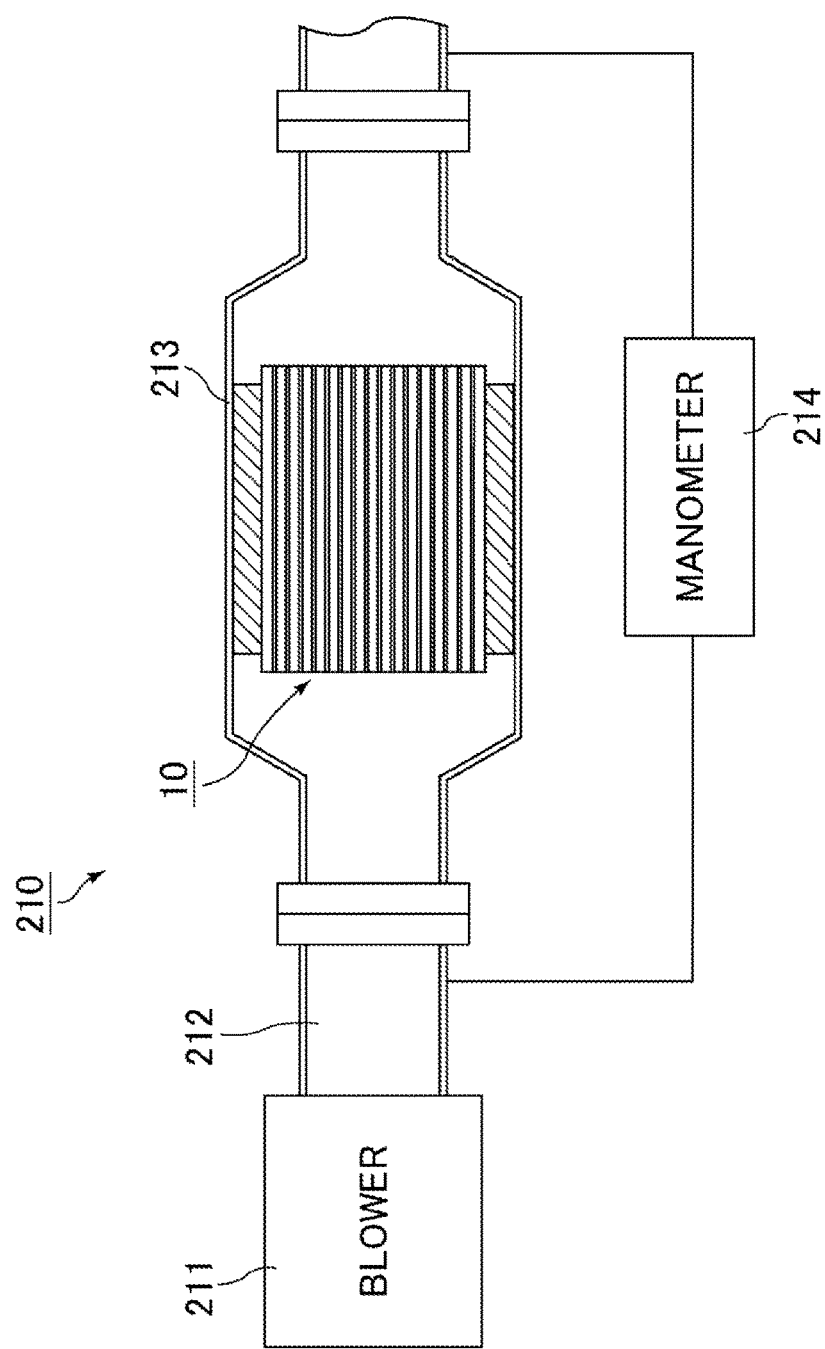
FIG. 5 is a cross-sectional view schematically showing how the pressure loss is measured.

As for the honeycomb fired bodies manufactured in Example 1 and Comparative Examples 1 and 2, the pressure loss at an early stage and the pressure loss at the time of accumulation of 8 g/L of PM in the honeycomb fired bodies were measured using a pressure loss measuring device as shown in FIG. 5. A diesel engine was separately used to accumulate PM on the honeycomb fired bodies.
(Measurement of Pressure Loss)

FIG. 5 is an explanatory view schematically showing a pressure loss measuring device.

A pressure loss measuring device 210 includes a blower 211, an exhaust gas pipe 212 connected to the blower 211, a metal casing 213 fixedly containing the honeycomb fired body 10 therein, and a manometer 214 whose tubes are arranged in such a manner to allow detection of the pressure of gas before and after flowing through the honeycomb fired body 10. Specifically, with the pressure loss measuring device 210, the pressure loss is measured by flowing gas through the honeycomb filter 10 and measuring the pressure of the gas before and after flowing through the honeycomb filter 10.

The blower 211 was operated at a flow gas rate of 10 m$^3$/h, and the pressure loss was measured.

The pressure loss at an early stage and the pressure loss at the time of accumulation of 8 g/L of PM were 5.87 kPa and 7.49 kPa, respectively, in the honeycomb fired body according to Comparative Example 1, and were 4.02 kPa and 6.04 kPa, respectively, in the honeycomb fired body according to Comparative Example 2. In contrast, in the honeycomb fired body according to Example 1, the pressure loss at an early stage and the pressure loss at the time of accumulation of 8 g/L of PM were 3.60 kPa and 5.95 kPa, respectively. Thus, the pressure loss at an early stage and the pressure loss at the time of accumulation of PM were low as compared to Comparative Examples 1 and 2.

Second Embodiment

The following will describe the honeycomb filter according to the second embodiment of the present invention.

The honeycomb filter according to the second embodiment includes a honeycomb fired body including porous cell partition walls defining a plurality of cells that serve as channels of exhaust gas, exhaust gas introduction cells each having an open end at an exhaust gas inlet side and a plugged end at an exhaust gas outlet side, exhaust gas emission cells each having an open end at the exhaust gas outlet side and a plugged end at the exhaust gas inlet side, and an outer wall on the periphery thereof.

In addition, the exhaust gas emission cells, except for the cells adjacent to the outer wall, are each adjacently surrounded fully by the exhaust gas introduction cells across the porous cell partition walls; the cells adjacent to the outer wall include the exhaust gas introduction cells and the exhaust gas emission cells; a substantial ratio of the number of the exhaust gas introduction cells to the number of the exhaust gas emission cells (exhaust gas introduction cells: exhaust gas emission cells) is 4:1; and all the exhaust gas introduction cells, except for the cells adjacent to the outer wall, have the same cross-sectional area in a plane perpendicular to the longitudinal direction thereof, the cross-sectional area of each exhaust gas introduction cell being smaller than that of each exhaust gas emission cell in a plane perpendicular to the longitudinal direction thereof.

In the present embodiment, all the exhaust gas introduction cells have the same pentagonal cross-sectional shape, and the exhaust gas emission cells have an octagonal cross-sectional shape formed by linearly chamfering the corners of a square.

The cells adjacent to the outer wall include the exhaust gas introduction cells and the exhaust gas emission cells which are alternately arranged with each other.

In addition, the cross-sectional shape of each exhaust gas introduction cell in a plane perpendicular to the longitudinal direction thereof is entirely uniform from the end at the exhaust gas inlet side to the end at the exhaust gas outlet side excluding the plugged portion; and the cross-sectional shape of each exhaust gas emission cell in a plane perpendicular to the longitudinal direction thereof is entirely uniform from the end at the exhaust gas inlet side to the end at the exhaust gas outlet side excluding the plugged portion.

Specifically, the honeycomb filter according to the second embodiment is a honeycomb filter similar to the honeycomb filter according to the first embodiment, and the basic cell shapes and arrangement are the same as those in the honeycomb filter according to the first embodiment. However, the honeycomb filter according to the second embodiment is different from the honeycomb filter according to the first embodiment in that the cross-sectional shape of the exhaust gas emission cells is an octagon formed by chamfering the corners of a square.

Figure 6A:
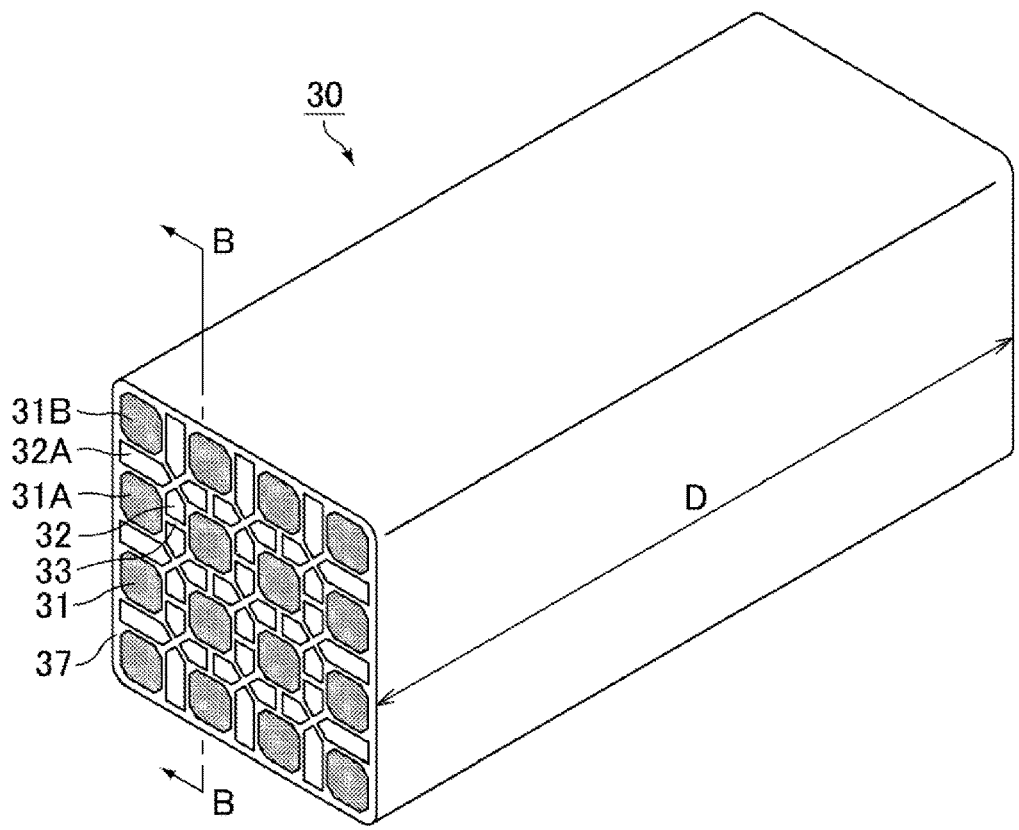
FIG. 6(a) is a perspective view schematically showing an example of a honeycomb fired body constituting a honeycomb filter according to a second embodiment of the present invention.
Figure 6B:
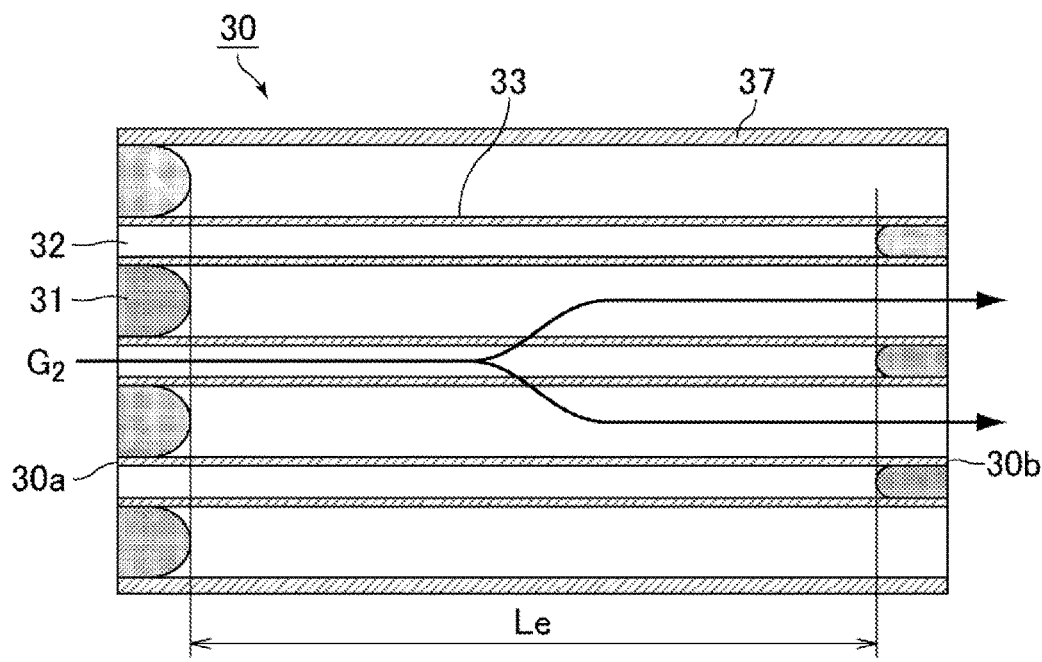
FIG. 6(b) is a cross-sectional view of the honeycomb fired body shown in FIG. 6(a), taken along line B-B.
Figure 8A:
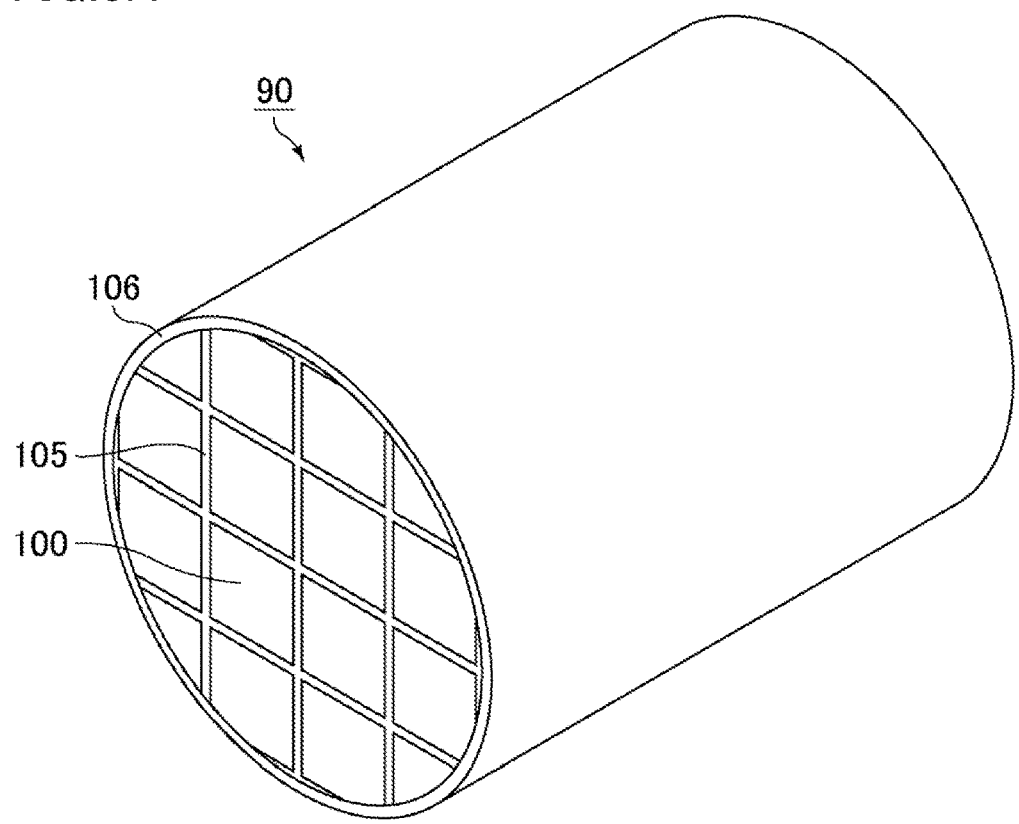
FIG. 8(a) is a perspective view schematically showing a honeycomb filter disclosed in Patent Literature 1.
Figure 8B:
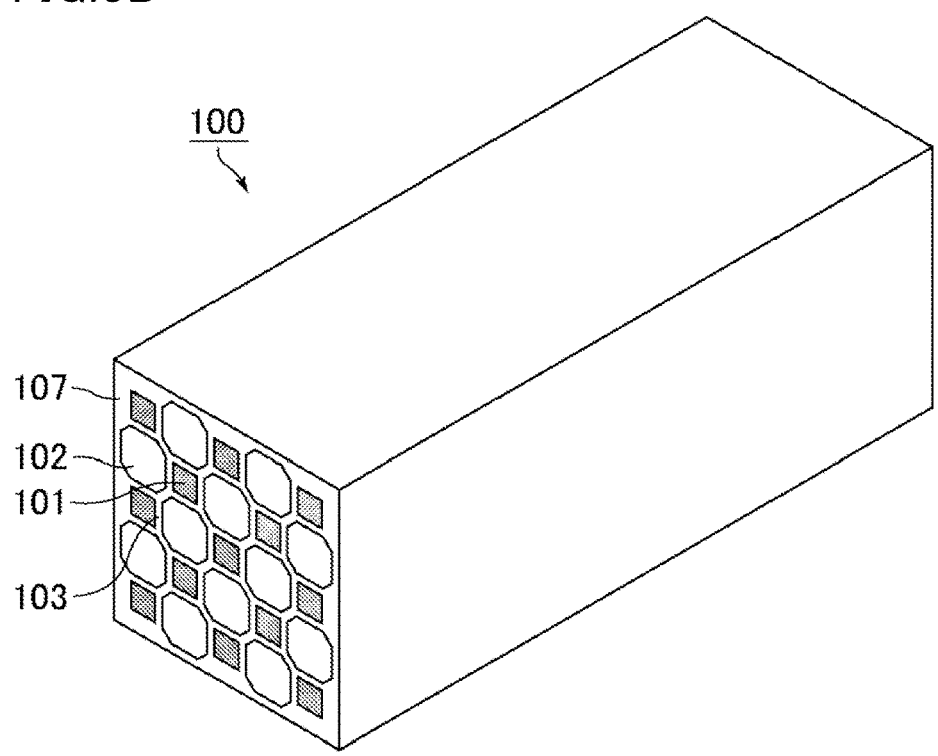
FIG. 8(b) is a perspective view schematically showing a honeycomb fired body constituting the honeycomb filter.
Figure 9A:
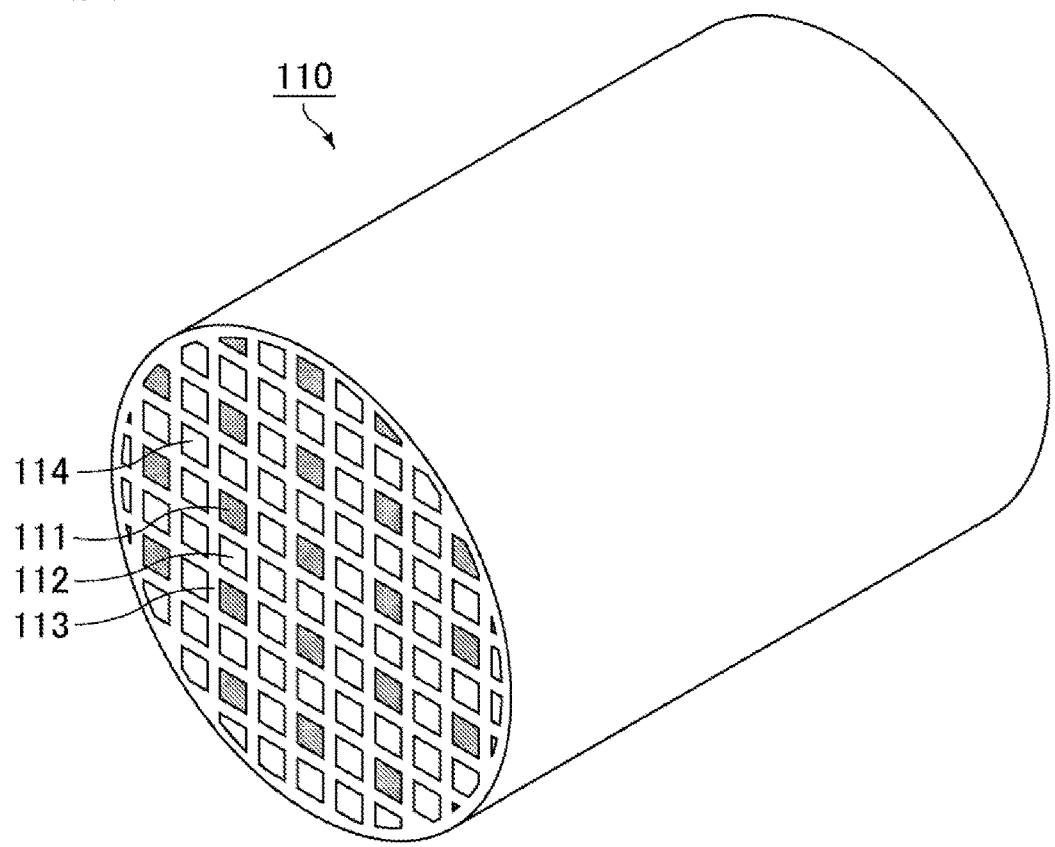
FIG. 9(a) is a perspective view schematically showing a honeycomb filter disclosed in Patent Literature 2.
Figure 9B:
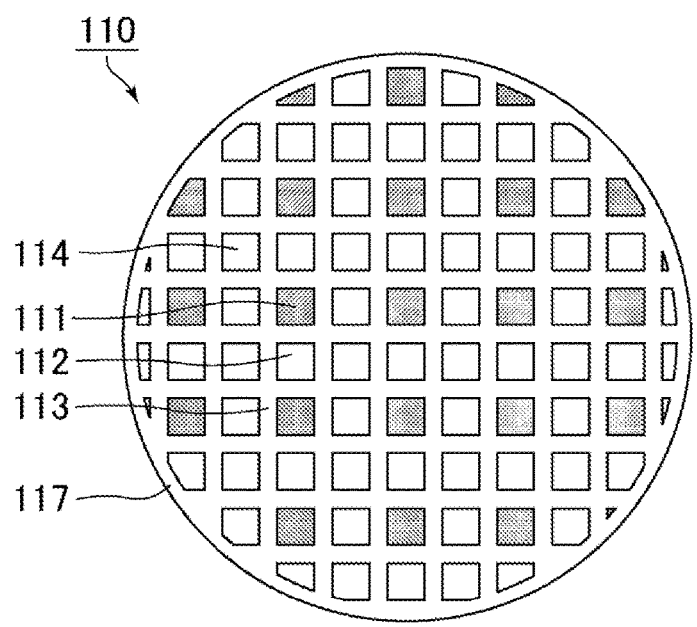
FIG. 9(b) is a view schematically showing an end face of the honeycomb filter.
Figure 10:
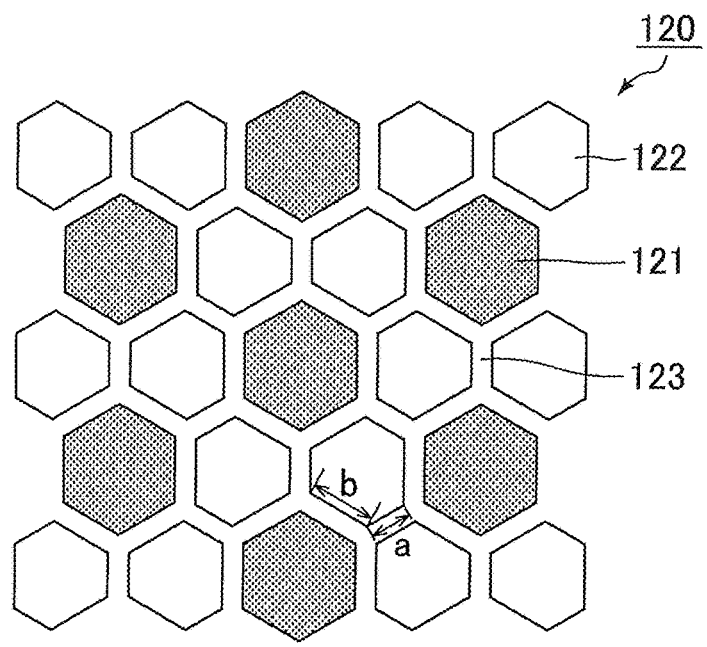
FIG. 10 is a cross-sectional view schematically showing a cross section of a honeycomb filter disclosed in Patent Literature 3.

FIG. 6(a) is a perspective view schematically showing a honeycomb fired body constituting the honeycomb filter according to the second embodiment of the present invention. FIG. 6(b) is a cross-sectional view of the honeycomb fired body according to the second embodiment of the present invention, which is shown in FIG. 6(a), taken along line B-B. FIG. 7 is an enlarged end face view in which a portion of an end face of the honeycomb fired body shown in FIG. 6 is enlarged. The structure of the honeycomb filter is the same as that of the honeycomb filter 20, except that the shapes of the exhaust gas emission cells constituting the honeycomb fired body are as shown in FIG. 6(a) and FIG. 6(b). Thus, the drawing thereof is omitted.

A honeycomb fired body 30 shown in FIG. 6(a) and FIG. 6(b) is basically the same as the honeycomb fired body 10 shown in FIG. 3(a) constituting the honeycomb filter 20, except that each exhaust gas emission cell 31 has an octagonal cross-sectional shape formed by chamfering the corners of a square. Each exhaust gas emission cell 31 having an octagonal cross section is adjacently surrounded fully, across porous cell partition walls 33, by eight exhaust gas introduction cells 32 each having a pentagonal cross section and having sides 32a, 32b, 32c, 32d, and 32e (see FIG. 7). All the exhaust gas introduction cells 32, except for the cells adjacent to an outer wall 37, have the same shape which is a pentagon with three 90° internal angles and two non-adjacent 135° internal angles, and the pentagon is formed from a combination of a rectangle and a right-angled isosceles triangle. Two exhaust gas introduction cells 32 adjacent to one side of the cross section of the exhaust gas emission cell 31 have cross-sectional shapes that face away from each other. Four pentagons are arranged in such a manner that the right angled portions of their right-angled isosceles triangles face one another. All the exhaust gas emission cells 31, except for the cells adjacent to the outer wall 37, also have the same shape.

As shown in FIG. 1(a), when a square formed by connecting the centroid of each of four exhaust gas emission cells 11 is considered as one unit of this pattern of arrangement, this unit includes four exhaust gas introduction cells 12 in such a manner that the right angled portions of their right-angled isosceles triangles face one another at the center of the unit, forming a cross shape. Four ¼ portions of the exhaust gas emission cells 11 are respectively located at the four empty corners of the square. Thus, the number of the exhaust gas introduction cells 12 is four times that of the exhaust gas emission cells 11. All the exhaust gas introduction cells 12 have the same cross-sectional area.

The outer wall 37 is configured in the same manner as in the honeycomb filter 20 according to the first embodiment.

In regard to the cells adjacent to the outer wall 37, as shown in FIG. 7, exhaust gas introduction cells 32A and exhaust gas emission cells 31A are alternately arranged with each other. The exhaust gas introduction cells 32A are pentagonal, and the area of the rectangular portion of the pentagon is large, as compared to the exhaust gas introduction cells 32 not adjacent to the outer wall 37. In contrast, the shape and the area of each exhaust gas emission cell 31A adjacent to the outer wall 37 are the same as those of each exhaust gas emission cell 31 not adjacent to the outer wall 37.

The area of each exhaust gas emission cell 31A adjacent to the outer wall 37 is preferably 65 to 90%, more preferably 70 to 85%, of the area of each exhaust gas emission cell 31 other than the exhaust gas emission cells 31A adjacent to the outer wall 37.

In addition, the area of each exhaust gas introduction cell 32A adjacent to the outer wall 37 is preferably 130 to 200%, more preferably 150 to 180%, of the area of each exhaust gas introduction cell 32 other than the exhaust gas introduction cells 32A adjacent to the outer wall 37.

Exhaust gas emission cells 31B located at the corners of the honeycomb fired body 30 also have the same shape as other exhaust gas emission cells 31.

In the honeycomb filter of the present embodiment, as described above, the flow-through resistance of the exhaust gas introduction cells 32 is slightly high due to the fact that the cross-sectional area of each exhaust gas introduction cell 32 is smaller than the cross-sectional area of each exhaust gas emission cell 31. However, because of the flow-through resistance, the flow rate of exhaust gas flowing into the exhaust gas introduction cells 32 is reduced and becomes uniform, and exhaust gas passes through a wide range of cell partitions walls 33 in the longitudinal direction of the cells of the honeycomb filter and flows into the exhaust gas emission cells 31. In addition, the aperture ratio of the exhaust gas introduction cells 32 in the honeycomb filter is higher than the aperture ratio of the exhaust gas emission cells 31 in the honeycomb filter, and the cross-sectional area of each exhaust gas emission cell 31 is larger than the cross-sectional area of each exhaust gas introduction cell 32. Thus, the effect of reducing the flow-through resistance (e) of the exhaust gas emission cells 31 and the outflow resistance (f) upon flowing of exhaust gas out of the honeycomb filter is high, and as a result, the pressure loss can be reduced, as compared to the conventional honeycomb filter 90.

Since the cross-sectional shape of each exhaust gas emission cell 31 is an octagon, the flow-through resistance (e) of the exhaust gas emission cells 31 and the outflow resistance (f) upon flowing of exhaust gas out of the honeycomb filter are further reduced, as compared to the honeycomb filter 20 according to the first embodiment.

In addition, the cell partition walls 33 are thick at the chamfered portions of the exhaust gas emission cells 31. This increases the mechanical strength of the honeycomb fired body, and suppresses cracking even under thermal stress during burning of accumulated PM.

In regard to the cross-sectional shape of each exhaust gas emission cell 31, a vertex of each exhaust gas emission cell 31 is chamfered, thus forming an octagon. The chamfer ratio R of the exhaust gas emission cells 31, which is expressed by the following equation (1), is preferably 50 to 100%:

$$\text{Chamfer or rounding ratio } R(\%) = (\beta/\alpha) \times 100 \quad (1),$$

where α represents the length of a side 31a of the exhaust gas emission cell 31 in a cross section perpendicular to the longitudinal direction thereof, and β represents the length of a linearly chamfered or rounded portion of one side of the exhaust gas emission cell 31 in a cross section perpendicular to the longitudinal direction thereof.

The chamfer or rounding ratio R in the present embodiment is described with reference to FIG. 7. The cross section of the exhaust gas emission cell 31 is an octagon formed by chamfering the corners of a square. This octagon is point-symmetric with respect to the centroid. All the linearly chamfered portions (i.e., the hypotenuse sides indicated with 31b in FIG. 7) have the same length, and all the vertical or horizontal sides of each exhaust gas emission cell 31 (the side indicated with 31a in FIG. 7) have the same length. In addition, four hypotenuse sides and four vertical or horizontal sides of the octagon are alternately arranged with each other, and the angle formed between one hypotenuse side and one vertical or horizontal side is 135°.

In this case, the chamfer or rounding ratio R can be expressed by the following equation (2):

$$\text{Chamfer or rounding ratio } R(\%) = (\text{Length of hypotenuse side } 31b/\text{Length of vertical or horizontal side } 31a) \times 100 \quad (2)$$

The value preferably ranges from 50 to 100%.

The "hypotenuse side" generally refers to the longest side that is opposite to the right angle in a right-angled triangle;

however, herein, for convenience of explanation, a side formed by chamfering a corner of a square is referred to as a hypotenuse side, and a side other than the hypotenuse side is referred to as a vertical or horizontal side.

In the honeycomb filter of the present embodiment, at an early stage, a layer of accumulated PM is mainly formed on the cell partition walls 33 separating the exhaust gas introduction cell 32 and the exhaust gas emission cell 31 from each other, specifically on the cell partition walls 33 on the exhaust gas introduction cell 32 side. After a very short period of time, exhaust gas enters the cell partition walls 33 separating the exhaust gas introduction cells 32 from each other, and then passes through the cell partition walls 33 into the exhaust gas emission cells 31. Thus, PM gradually accumulates also on the cell partition walls 33 separating the exhaust gas introduction cells 32 from each other. As a result, PM accumulates substantially uniformly on the entire cell partition walls 33 defining the exhaust gas introduction cells 32. In the present invention, PM accumulates uniformly at an earlier stage, i.e., exhaust gas can easily pass through a greater number of cell partition walls 33 at an early stage. Thus, the initial pressure loss can be reduced.

In addition, all the exhaust gas introduction cells 12 have the same cross-sectional area, and the number of the exhaust gas introduction cells 12 is four times that of the exhaust gas emission cells 11. Thus, a substantial filtration area can be made sufficiently large. A layer of PM accumulated on the cell partition walls 33 defining the exhaust gas introduction cells 32 is thin, and the passage resistance (d) upon passage of exhaust gas through the layer of accumulated PM is kept low. As a result, the present invention can provide a honeycomb filter in which the pressure loss at an early stage is low and the pressure loss is less likely to increase even after accumulation of PM.

Owing to the above-described configuration of the outer wall 37 and its adjacent exhaust gas emission cells 31 and exhaust gas introduction cells 32, the honeycomb filter 30 according to the present embodiment achieves the following effects in addition to the effects described above: the outer wall 37 increases the strength of the honeycomb fired body 30, further reduces local variations in the volume ratio between the exhaust gas emission cells 31 and the exhaust gas introduction cells 32 in the honeycomb fired body 30, and thus allows exhaust gas to flow more uniformly. Also, exhaust gas can smoothly flow into the exhaust gas introduction cells 32 even near the outer wall 37, and the cell partition walls 33 and the outer wall 37 can function as filters. As a result, the pressure loss can be further reduced.

In the honeycomb filter of the present embodiment including the honeycomb fired body shown in FIG. 6(*a*) and FIG. 6(*b*), the ratio (%) of the cross-sectional area of each exhaust gas introduction cell 32 relative to the cross-sectional area of each exhaust gas emission cell 31 is preferably 30 to 50%, more preferably 35 to 45%.

In the honeycomb filter according to the second embodiment, preferably, the thickness of the cell partition walls of the honeycomb filter, the porosity of the cell partition walls, and the average pore diameter of the pores in the cell partition walls are the same as those of the honeycomb filter of the first embodiment.

The honeycomb filter according to the second embodiment may include a plurality of honeycomb fired bodies or a single honeycomb fired body. The honeycomb fired body is preferably formed of the same material as that of the honeycomb fired body according to the first embodiment. The number of cells per unit area in the cross section of the honeycomb fired body 30 is also preferably the same as that of the honeycomb fired body according to the first embodiment.

The honeycomb filter according to the second embodiment of the present invention may include a peripheral coat layer on the periphery thereof. The material of the peripheral coat layer is preferably the same as that of the adhesive.

The thickness of the peripheral coat layer is preferably 0.1 to 3.0 mm.

The honeycomb filter of the present embodiment can be manufactured by the same method described for the first embodiment of the present invention, except that a die of a different shape is used in the extrusion molding step.

The honeycomb filter according to the present embodiment is the same as the honeycomb filter according to the first embodiment in terms of the basic arrangement of the cells, shape, plugging, and the like, and thus can achieve the same effects (1) to (11) described for the first embodiment. Further, since the cross-sectional shape of each exhaust gas emission cell 31 is an octagon, the flow-through resistance (e) of the exhaust gas emission cells and the outflow resistance (f) upon flowing of exhaust gas out of the honeycomb filter are further reduced, as compared to the honeycomb filter 20 according to the first embodiment.

In addition, the cell partition walls are thick at the chamfered portions of the exhaust gas emission cells 31. This increases the mechanical strength of the honeycomb fired body, and achieves an effect that suppresses cracking even under thermal stress during burning of accumulated PM.

REFERENCE SIGNS LIST

10, 30: Honeycomb fired body
20: Honeycomb filter
11, 11A, 11B, 31, 31A, 31B: Exhaust gas emission cell
11*a*, 11Aa, 31*a*, 31*b*: Side (side of the exhaust gas emission cell)
12, 12A, 32, 32A: Exhaust gas introduction cell
12*a*, 12*b*, 12*c*, 12*d*, 12*e*, 12*f*, 32*a*, 32*b*, 32*c*, 32*d*, 32*e*: Side (side of the exhaust gas introduction cell)
13, 13*a*, 13*b*, 13*c*, 33: Cell partition wall
15: Adhesive layer
16: Peripheral coat layer
17, 37: Outer wall
18: Ceramic block

The invention claimed is:

1. A honeycomb filter comprising:
a honeycomb fired body including porous cell partition walls defining a plurality of cells that serve as channels of exhaust gas, exhaust gas introduction cells each having an open end at an exhaust gas inlet side and a plugged end at an exhaust gas outlet side, exhaust gas emission cells each having an open end at the exhaust gas outlet side and a plugged end at the exhaust gas inlet side, and an outer wall on a periphery thereof, wherein
a cross-sectional shape of each exhaust gas introduction cell in a plane perpendicular to a longitudinal direction thereof is entirely uniform from an end at the exhaust gas inlet side to an end at the exhaust gas outlet side excluding a plugged portion,
a cross-sectional shape of each exhaust gas emission cell in a plane perpendicular to a longitudinal direction thereof is entirely uniform from an end at the exhaust gas inlet side to an end at the exhaust gas outlet side excluding a plugged portion, the exhaust gas emission cells, except for cells adjacent to the outer wall, are each adjacently surrounded fully by the exhaust gas introduction cells across the porous cell partition walls, cells adjacent to the outer wall include the exhaust gas introduction cells and the exhaust gas emission cells, a substantial ratio of number of the exhaust gas introduction cells to number of the exhaust gas emission cells (exhaust gas introduction cells:exhaust gas emission cells) is 4:1, all the exhaust gas introduction cells, except for cells adjacent to the outer wall, have same cross-sectional area in a plane perpendicular to a longitudinal direction thereof, a cross-sectional area of each exhaust gas introduction cell being smaller than that of each exhaust gas emission cell in a plane perpendicular to a longitudinal direction thereof, the outer wall has corners, and each of the exhaust gas introduction cells adjacent to the outer wall and each of the exhaust gas emission cells adjacent to the outer wall have a side in contact with the outer wall in a cross section perpendicular to the longitudinal direction of the cells, the side being straight and parallel to a side defining an outer periphery of the outer wall, the thickness of the outer wall excluding the corners is uniform, and the area of each exhaust gas introduction cell adjacent to the outer wall is 130 to 200% of the area of each exhaust gas introduction cell other than the exhaust gas introduction cells adjacent to the outer wall.

2. The honeycomb filter according to claim 1,
wherein, in a cross section of the honeycomb filter in a plane perpendicular to a longitudinal direction of cells,
exhaust gas introduction cells which correspond to four exhaust gas introduction cells and parts of exhaust gas emission cells which correspond to one exhaust gas emission cell are present in a square formed by connecting a centroid of each of four adjacent exhaust gas emission cells.

3. The honeycomb filter according to claim 1,
wherein cells adjacent to the outer wall include the exhaust gas introduction cells and the exhaust gas emission cells which are alternately arranged with each other.

4. The honeycomb filter according to claim 1,
wherein, in a cross section perpendicular to a longitudinal direction of cells,
all the exhaust gas introduction cells are pentagonal, and the exhaust gas emission cells are square or octagonal.

5. The honeycomb filter according to claim 4,
wherein, in a cross section perpendicular to a longitudinal direction of cells,
the exhaust gas introduction cells are pentagonal with three 90° internal angles and two non-adjacent 135° internal angles,
the exhaust gas emission cells are square, and
each exhaust gas emission cell is surrounded by eight exhaust gas introduction cells.

6. The honeycomb filter according to claim 4,
wherein a thickness of the cell partition walls separating cells of the honeycomb filter from each other is entirely uniform.

7. The honeycomb filter according to claim 1,
wherein, in a cross section perpendicular to a longitudinal direction of cells,
a vertex of each cell is linearly chamfered or rounded, and
a chamfer or rounding ratio R of cells, which is expressed by the following equation (1), is 50 to 100%:

$$\text{Chamfer or rounding ratio } R(\%)=(\beta/\alpha)\times 100 \quad (1),$$

where $\alpha$ represents the length of one side of a cell in a cross section perpendicular to the longitudinal direction thereof, and $\beta$ represents the length of a linearly chamfered or rounded portion of one side of a cell in a cross section perpendicular to the longitudinal direction thereof.

8. The honeycomb filter according to claim 1,
wherein the honeycomb filter is formed by combining a plurality of honeycomb fired bodies with one another with an adhesive layer therebetween, and the number of the exhaust gas introduction cells is 3.2 to 4.0 times that of the exhaust gas emission cells.

9. The honeycomb filter according to claim 1,
wherein a thickness of the cell partition walls is 0.075 mm to 0.310 mm.

10. The honeycomb filter according to claim 1,
wherein a porosity of the cell partition walls is 40 to 65%.

11. The honeycomb filter according to claim 1,
wherein the honeycomb fired body is formed of silicon carbide or silicon-containing silicon carbide.

12. The honeycomb filter according to claim 1,
wherein a peripheral coat layer is formed on the periphery of the honeycomb filter.

* * * * *